United States Patent
Kojima et al.

(10) Patent No.: US 11,444,319 B2
(45) Date of Patent: Sep. 13, 2022

(54) ALL-SOLID BATTERY AND METHOD OF MANUFACTURING THE SAME

(71) Applicant: Panasonic Intellectual Property Management Co., Ltd., Osaka (JP)

(72) Inventors: Toshiyuki Kojima, Kyoto (JP); Akihiro Horikawa, Osaka (JP); Motohiro Okochi, Osaka (JP); Kazufumi Miyatake, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 215 days.

(21) Appl. No.: 16/714,593

(22) Filed: Dec. 13, 2019

(65) Prior Publication Data

US 2020/0212479 A1 Jul. 2, 2020

(30) Foreign Application Priority Data

Dec. 28, 2018 (JP) .............................. JP2018-248038
Dec. 3, 2019 (JP) .............................. JP2019-218454

(51) Int. Cl.
*H01M 6/04* (2006.01)
*H01M 10/0562* (2010.01)
(Continued)

(52) U.S. Cl.
CPC ....... *H01M 10/0562* (2013.01); *H01M 4/364* (2013.01); *H01M 2004/027* (2013.01); *H01M 2004/028* (2013.01)

(58) Field of Classification Search
CPC ......... H01M 10/0562; H01M 10/0561; H01M 4/364; H01M 4/366; H01M 4/362;
(Continued)

(56) References Cited

U.S. PATENT DOCUMENTS

2008/0261111 A1 10/2008 Shimizu et al.
2014/0162138 A1 6/2014 Fujiki et al.
(Continued)

FOREIGN PATENT DOCUMENTS

EP 3 358 663 8/2018
JP 11-73943 * 3/1999 .............. H01M 4/02
(Continued)

OTHER PUBLICATIONS

Extended European Search Report dated Jun. 23, 2020 in corresponding European Patent Application No. 19219386.0.

*Primary Examiner* — Raymond Alejandro
(74) *Attorney, Agent, or Firm* — Wenderoth, Lind & Ponack, L.L.P.

(57) ABSTRACT

An all-solid battery includes a positive-electrode layer, a negative-electrode layer, and a solid electrolyte layer. The positive-electrode layer includes a positive-electrode current collector, a positive-electrode bonding layer containing at least a conductive agent comprising non-metal and formed on the positive-electrode current collector, and a positive-electrode mixture layer containing at least a positive-electrode active material and a solid electrolyte and formed on the positive-electrode bonding layer. The negative-electrode layer includes a negative-electrode current collector and a negative-electrode mixture layer containing at least a negative-electrode active material and the solid electrolyte. The solid electrolyte layer is disposed between the positive-electrode mixture layer and the negative-electrode mixture layer and contains the solid electrolyte. A concentration of a binder contained in the positive-electrode mixture layer is less than or equal to 100 ppm and a concentration of a solvent contained in the positive-electrode mixture layer is less than or equal to 50 ppm.

4 Claims, 11 Drawing Sheets

(51) Int. Cl.
 *H01M 4/36* (2006.01)
 *H01M 4/02* (2006.01)

(58) Field of Classification Search
 CPC ............... H01M 4/625; H01M 4/624; H01M 2004/027; H01M 2004/028
 See application file for complete search history.

(56) References Cited

U.S. PATENT DOCUMENTS

| | | |
|---|---|---|
| 2016/0365604 A1 | 12/2016 | Mimura et al. |
| 2018/0226681 A1 | 8/2018 | Hasegawa et al. |

FOREIGN PATENT DOCUMENTS

| | | |
|---|---|---|
| JP | 11-073943 | 3/1999 |
| JP | 2009-301825 | 12/2009 |
| JP | 2018-125260 | 8/2018 |

\* cited by examiner

ALL-SOLID BATTERY AND METHOD OF MANUFACTURING THE SAME

BACKGROUND

1. Technical Field

The present disclosure relates to a positive-electrode layer, a negative-electrode layer, a solid electrolyte layer, an all-solid battery using the positive-electrode layer, the negative-electrode layer, and the solid electrolyte layer, and a method of manufacturing the all-solid battery.

2. Description of the Related Art

In recent years, development of a secondary battery that can be used repeatedly has been required due to light weighted and cordless electronic devices such as personal computers and mobile phones. Examples of secondary batteries include nickel cadmium batteries, nickel hydrogen batteries, lead storage batteries, and lithium ion batteries. Among these batteries, lithium ion batteries are attracting attention because of the features such as light weight, high voltage, and high energy density.

For example, lithium ion batteries are constituted by a positive-electrode layer, a negative-electrode layer, and an electrolyte disposed between the positive-electrode layer and the negative-electrode layer. For example, an electrolytic solution in which a supporting salt such as lithium hexafluorophosphate is dissolved in an organic solvent, or a solid electrolyte is used as the electrolyte. At present, lithium ion batteries widely used are flammable because an electrolyte containing an organic solvent is used. For this reason, materials, structures, and systems are needed to ensure the safety of lithium ion batteries. By using a non-combustible solid electrolyte as the electrolyte, it is expected that the materials, structures, and systems described above can be simplified, and it is considered that the increase of energy density, the reduction of manufacturing costs, and the improvement of productivity can be achieved. Hereinafter, a lithium ion battery using a solid electrolyte is referred to as "all-solid battery".

Solid electrolytes can be roughly divided into organic solid electrolytes and inorganic solid electrolytes. The organic solid electrolyte has an ion conductivity of about $10^{-6}$ S/cm at 25° C. The ion conductivity of the organic solid electrolyte is extremely lower than that of an electrolyte solution of about $10^{-3}$ S/cm. Consequently, it is difficult to operate an all-solid battery using the organic solid electrolyte in an environment of 25° C. Inorganic solid electrolytes include an oxide-based solid electrolyte and a sulfide-based solid electrolyte. The ion conductivity of these electrolytes is about $10^{-4}$ to $10^{-3}$ S/cm, and the ion conductivity is relatively high. The oxide-based solid electrolyte has high grain-boundary resistance. Sintering and thinning of powder have been studied as a means of reducing the grain-boundary resistance. However, in a case of sintering, because constituent elements of a positive-electrode or a negative-electrode and constituent elements of the solid electrolyte mutually diffuse due to a treatment at a high temperature. It is thus difficult to obtain sufficient characteristics. Therefore, in an all-solid battery using an oxide-based solid electrolyte, thinning is mainly studied. Meanwhile, the sulfide-based solid electrolyte has lower grain-boundary resistance than the oxide-based solid electrolyte. Good characteristics can be obtained only by compression-molding powder, and thus an all-solid battery using a sulfide-based solid electrolyte has been studied intensively in recent years.

A coating-type all-solid battery is constituted by a positive-electrode mixture layer, a negative-electrode mixture layer, and a solid electrolyte layer. The positive-electrode mixture layer is formed on a current collector comprising a metal foil and contains a positive-electrode active material, a solid electrolyte, and a binder. The negative-electrode mixture layer is formed on the current collector comprising a metal foil and contains a negative-electrode active material, a solid electrolyte, and a binder. The solid electrolyte layer is disposed between the positive-electrode layer and the negative-electrode layer and contains a solid electrolyte. The coating type all-solid battery is manufactured by a step of forming the respective materials of the positive-electrode mixture layer and the negative-electrode mixture layer into slurry using an organic solvent and forming these materials on the metal foil. The organic solvent remaining after manufacturing the coating type all-solid battery changes the solid electrolyte contained in the positive-electrode mixture layer and the negative-electrode mixture layer, so that ion conductivity decreases and battery characteristics of the all-solid battery are degraded accordingly.

In order to solve the problems described above, Patent Literature (PTL) 1 discloses an all-solid battery in which a positive-electrode mixture layer and a negative-electrode mixture layer do not substantially contain an organic solvent.

CITATION LIST

Patent Literature

PTL 1: Unexamined Japanese Patent Publication No. 2018-125260

SUMMARY

In order to solve the above problems, an all-solid battery according to an aspect of the present disclosure includes a positive-electrode layer that includes (i) a positive-electrode current collector, (ii) a positive-electrode bonding layer that contains at least a conductive agent comprising non-metal and is formed on the positive-electrode current collector, and (iii) a positive-electrode mixture layer that contains at least a positive-electrode active material and a solid electrolyte having ion conductivity and is formed on the positive-electrode bonding layer, a negative-electrode layer that includes (i) a negative-electrode current collector and (ii) a negative-electrode mixture layer that contains at least a negative-electrode active material and the solid electrolyte having ion conductivity, and a solid electrolyte layer that is disposed between the positive-electrode mixture layer and the negative-electrode mixture layer and contains at least the solid electrolyte having ion conductivity. A concentration of a binder contained in the positive-electrode mixture layer is less than or equal to 100 ppm and a concentration of a solvent contained in the positive-electrode mixture layer is less than or equal to 50 ppm.

An all-solid battery according to another aspect of the present disclosure includes a positive-electrode layer that includes (i) a positive-electrode current collector and (ii) a positive-electrode mixture layer that contains at least a positive-electrode active material and a solid electrolyte having ion conductivity, a negative-electrode layer that includes (i) a negative-electrode current collector, (ii) a negative-electrode bonding layer that contains at least a second conductive agent comprising non-metal and is formed on the negative-electrode current collector, and (iii) a negative-electrode mixture layer that contains at least a negative-electrode active material and the solid electrolyte having ion conductivity and is formed on the negative-electrode bonding layer, and a solid electrolyte layer that is disposed between the positive-electrode mixture layer and the negative-electrode mixture layer and contains at least the solid electrolyte having ion conductivity. A concentration of a binder contained in the negative-electrode mixture layer is less than or equal to 100 ppm and a concentration of a solvent contained in the negative-electrode mixture layer is less than or equal to 50 ppm.

A method of manufacturing an all-solid battery according to an aspect of the present disclosure is a method of manufacturing an all-solid battery that includes a positive-electrode layer that has a positive-electrode mixture layer in which a concentration of a solvent is less than or equal to 50 ppm and a concentration of a binder is less than or equal to 100 ppm, a negative-electrode layer that has a negative-electrode mixture layer, and a solid electrolyte layer. The method includes forming a positive-electrode bonding layer that contains at least a conductive agent on a positive-electrode current collector, applying positive-electrode mixture powder that contains at least a solid electrolyte and a positive-electrode active material on the positive-electrode bonding layer, pressing the positive-electrode mixture powder from above and below in a stacking direction together with the positive-electrode current collector and the positive-electrode bonding layer to form a positive-electrode layer that is an integrated body of the positive-electrode current collector, the positive-electrode bonding layer, and the positive-electrode mixture layer, and forming an all-solid battery using the positive-electrode layer.

A method of manufacturing an all-solid battery according to another aspect of the present disclosure is a method of manufacturing an all-solid battery that includes a negative-electrode layer that has a negative-electrode mixture layer in which a concentration of a solvent is less than or equal to 50 ppm and a concentration of a binder is less than or equal to 100 ppm, a positive-electrode layer that has a positive-electrode mixture layer, and a solid electrolyte layer. The method includes forming a negative-electrode bonding layer that contains at least a conductive agent on a negative-electrode current collector, applying negative-electrode mixture powder that contains at least a solid electrolyte and a negative-electrode active material on the negative-electrode bonding layer, pressing the negative-electrode mixture powder from above and below in a stacking direction together with the negative-electrode current collector and the negative-electrode bonding layer to form a negative-electrode layer that is an integrated body of the negative-electrode current collector, the negative-electrode bonding layer, and the negative-electrode mixture layer, and forming an all-solid battery using the negative-electrode layer.

DETAILED DESCRIPTION

Figure 1:
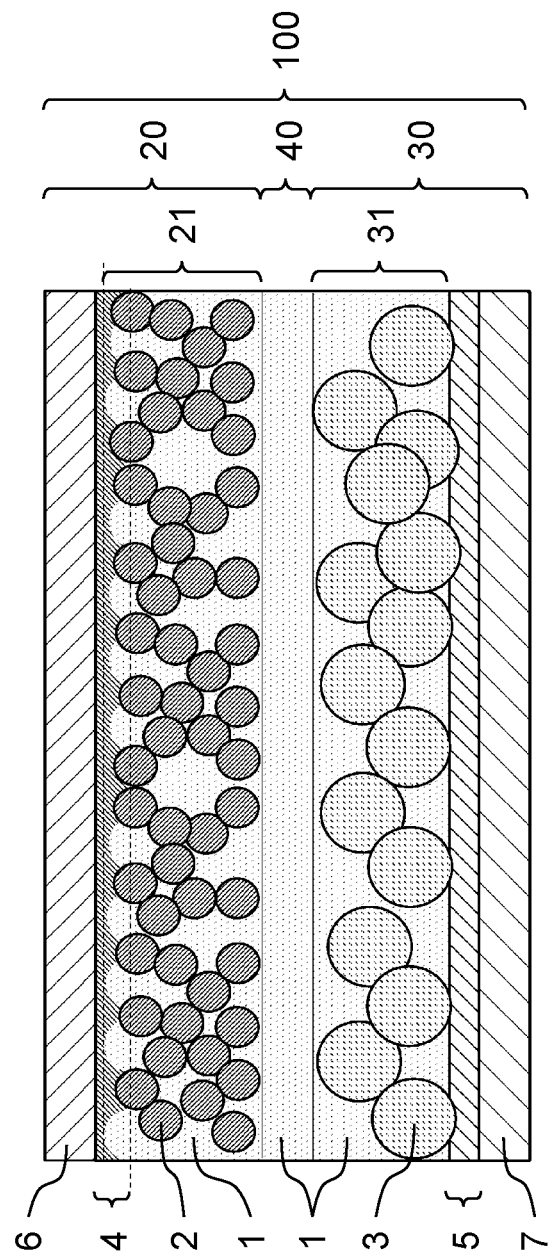
FIG. 1 is a schematic cross-sectional view of an all-solid battery according to the present exemplary embodiment.

In the manufacturing method disclosed in PTL 1, a concentration of an organic solvent in a positive-electrode mixture layer and a negative-electrode mixture layer is less than or equal to 50 ppm. In this case, the organic solvent is not substantially contained in these layers. Consequently, it is possible to prevent a decrease in battery characteristics of an all-solid battery. However, the battery characteristics are not still obtained sufficiently. In order to ensure sufficient battery characteristics, it is necessary to eliminate a binder in the positive-electrode mixture layer and the negative-electrode mixture layer. As the binder hinders lithium ion conduction and electron conduction, charge-discharge characteristics are degraded. However, the binder functions as an adhesive material. If the positive-electrode mixture layer and the negative-electrode mixture layer do not contain the binder, sufficient adhesive strength cannot be obtained. It is thus difficult to maintain a film shape of a positive-electrode layer and a negative-electrode layer during a manufacturing process. As a result, it is difficult to manufacture an all-solid battery.

The present disclosure has been achieved in view of the above problems, and an object of the present disclosure is to provide an all-solid battery whose shape is maintained even though a positive-electrode mixture layer does not contain a binder.

An all-solid battery according to an aspect of the present disclosure includes a positive-electrode layer that includes (i) a positive-electrode current collector, (ii) a positive-electrode bonding layer that contains at least a first conductive agent comprising non-metal and is formed on the positive-electrode current collector, and (iii) a positive-electrode mixture layer that contains at least a positive-electrode active material and a solid electrolyte having ion conductivity and is formed on the positive-electrode bonding layer, a negative-electrode layer that includes (i) a negative-electrode current collector and (ii) a negative-electrode mixture layer that contains at least a negative-electrode active material and the solid electrolyte having ion conductivity, and a solid electrolyte layer that is disposed between the positive-electrode mixture layer and the negative-electrode mixture layer and contains at least the solid electrolyte having ion conductivity. A concentration of a binder contained in the positive-electrode mixture layer is less than or equal to 100 ppm and a concentration of a solvent contained in the positive-electrode mixture layer is less than or equal to 50 ppm.

The positive-electrode mixture layer that does not contain the binder is thus bonded to the positive-electrode current collector via the positive-electrode bonding layer. When the positive-electrode mixture layer does not contain the binder, adhesive strength with the positive-electrode current collector is low and thus the positive-electrode mixture layer is easily peeled from the positive-electrode current collector. However, the positive-electrode mixture layer is adhered to the positive-electrode bonding layer by an anchor effect in which the conductive agent contained in the positive-electrode bonding layer enters the solid electrolyte and the positive-electrode active material that are contained in the positive-electrode mixture layer, and thus high adhesive strength is achieved. In addition, when the positive-electrode bonding layer contains the binder, the positive-electrode current collector is adhered to the positive-electrode bonding layer via the binder. The positive-electrode mixture layer is thus bonded to the positive-electrode current collector via the positive-electrode bonding layer with high adhesive strength. As the positive-electrode mixture layer does not contain the binder, battery characteristics are not decreased by the binder. It is thus possible to provide an all-solid battery with improved battery characteristics while a shape of the all-solid battery is maintained.

As the positive-electrode mixture layer does not contain the solvent, the solid electrolyte contained in the positive-electrode mixture layer is not degraded by the solvent, and the battery characteristics of the all-solid battery are improved.

In the all-solid battery, the positive-electrode bonding layer may contain at least one of acetylene black, ketjen black (Registered Trademark), carbon black, graphite, and carbon fiber as the first conductive agent.

As the positive-electrode bonding layer contains a conductive carbon material, the conductive carbon material is easily plastically deformed, and the anchor effect is thus easily exhibited on the solid electrolyte and the positive-electrode active material that are contained in the positive-electrode mixture layer.

In the all-solid battery, for example, a weight per unit area of the positive-electrode bonding layer may be in a range of 0.3 g/m$^2$ to 3 g/m$^2$, inclusive.

An amount of the positive-electrode bonding layer is within a certain range, and thus the amount of the positive-electrode bonding layer used can be reduced while adhesive strength necessary for adhesion of the positive-electrode mixture layer and the positive-electrode current collector is maintained. As a result, costs can be reduced.

In the all-solid battery, for example, as viewed from a direction perpendicular to a stacking direction of the all-solid battery, a part of at least one of the positive-electrode active material and the solid electrolyte that are contained in the positive-electrode mixture layer may overlap the positive-electrode bonding layer, and a thickness of a region in the stacking direction is in a range of 2 µm to 6 µm, inclusive, the region being a region where the positive-electrode mixture layer overlaps the positive-electrode bonding layer.

A part of at least one of the positive-electrode active material and the solid electrolyte that are contained in the positive-electrode mixture layer thus enters the positive-electrode bonding layer. Consequently, a contact area of the positive-electrode bonding layer and the positive-electrode mixture layer increases and adhesive strength increases accordingly.

In the all-solid battery, for example, in a cross-section of the all-solid battery taken along a stacking direction, a number of openings that are present at an interface between the positive-electrode mixture layer and the solid electrolyte layer may be less than or equal to 3 per a length of the interface of 1 mm, each of the openings having a flat side, along the interface, of 2 µm or longer and a height, from the flat side, of 0.5 µm or higher.

As the number of the openings that hinder ion conduction is reduced, ion conduction between the positive-electrode mixture layer and the solid electrolyte is hardly hindered. The battery characteristics of the all-solid battery are thus improved.

An all-solid battery according to another aspect of the present disclosure includes a positive-electrode layer that includes (i) a positive-electrode current collector and (ii) a positive-electrode mixture layer that contains at least a positive-electrode active material and a solid electrolyte having ion conductivity, a negative-electrode layer that includes (i) a negative-electrode current collector, (ii) a negative-electrode bonding layer that contains at least a second conductive agent comprising non-metal and is formed on the negative-electrode current collector, and (iii) a negative-electrode mixture layer that contains at least a negative-electrode active material and the solid electrolyte having ion conductivity and is formed on the negative-electrode bonding layer, and a solid electrolyte layer that is disposed between the positive-electrode mixture layer and the negative-electrode mixture layer and contains at least the solid electrolyte having ion conductivity. A concentration of a binder contained in the negative-electrode mixture layer is less than or equal to 100 ppm and a concentration of a solvent contained in the negative-electrode mixture layer is less than or equal to 50 ppm.

The negative-electrode mixture layer that does not contain the binder is thus bonded to the negative-electrode current collector via the negative-electrode bonding layer. When the negative-electrode mixture layer does not contain the binder, adhesive strength with the negative-electrode current collector is low and thus the negative-electrode mixture layer is easily peeled from the negative-electrode current collector. However, the negative-electrode mixture layer is adhered to the negative-electrode bonding layer by an anchor effect in which the conductive agent contained in the negative-electrode bonding layer enters the solid electrolyte and the negative-electrode active material that are contained in the negative-electrode mixture layer and by intermolecular force due to close contact of the solid electrolyte and the negative-electrode active material, and thus high adhesive strength is achieved. In addition, when the negative-electrode bonding layer contains the binder, the negative-electrode current collector is adhered to the negative-electrode bonding layer via the binder. The negative-electrode mixture layer is thus bonded to the negative-electrode current collector via the negative-electrode bonding layer with high adhesive strength. As the negative-electrode mixture layer does not contain the binder, battery characteristics are not decreased by the binder. It is thus possible to provide an all-solid battery with improved battery characteristics while the shape of the all-solid battery is maintained.

As the negative-electrode mixture layer does not contain the solvent, the solid electrolyte contained in the negative-electrode mixture layer is not degraded by the solvent, and the battery characteristics of the all-solid battery are improved.

In the all-solid battery, for example, the negative-electrode bonding layer may contain at least one of acetylene black, ketjen black, carbon black, graphite, and carbon fiber as the second conductive agent.

As the negative-electrode bonding layer contains a conductive carbon material, the conductive carbon material is easily plastically deformed, and the anchor effect is thus easily exhibited on the solid electrolyte and the negative-electrode active material that are contained in the negative-electrode mixture layer.

In the all-solid battery, for example, a weight per unit area of the negative-electrode bonding layer may be in a range of 0.3 $g/m^2$ to 3 $g/m^2$, inclusive.

An amount of the negative-electrode bonding layer is within a certain range, and thus the amount of the negative-electrode bonding layer used can be reduced while adhesive strength necessary for adhesion of the negative-electrode mixture layer and the negative-electrode current collector is maintained. As a result, costs can be reduced.

In the all-solid battery, for example, a concentration of a binder contained in the solid electrolyte layer may be less than or equal to 100 ppm and a concentration of a solvent contained in the solid electrolyte layer may be less than or equal to 50 ppm.

As the solid electrolyte layer does not contain the binder, battery characteristics are not decreased by the binder, and the battery characteristics of the all-solid battery are improved. As the solid electrolyte layer does not contain the solvent, the solid electrolyte contained in the solid electrolyte layer is not degraded by the solvent, and the battery characteristics of the all-solid battery are improved.

A method of manufacturing an all-solid battery according to an aspect of the present disclosure is a method of manufacturing an all-solid battery that includes a positive-electrode layer that has a positive-electrode mixture layer in which a concentration of a solvent is less than or equal to 50 ppm and a concentration of a binder is less than or equal to 100 ppm, a negative-electrode layer that has a negative-electrode mixture layer, and a solid electrolyte layer. The method includes forming a positive-electrode bonding layer that contains at least a first conductive agent on a positive-electrode current collector, applying positive-electrode mixture powder that contains at least a solid electrolyte and a positive-electrode active material on the positive-electrode bonding layer, pressing the positive-electrode mixture powder from above and below in a stacking direction together with the positive-electrode current collector and the positive-electrode bonding layer to form a positive-electrode layer that is an integrated body of the positive-electrode current collector, the positive-electrode bonding layer, and the positive-electrode mixture layer, and forming an all-solid battery using the positive-electrode layer.

An all-solid battery in which the positive-electrode mixture layer that does not contain the binder is bonded to the positive-electrode current collector via the positive-electrode bonding layer is manufactured. When the positive-electrode mixture layer does not contain the binder, adhesive strength with the positive-electrode current collector is low and thus the positive-electrode mixture layer is easily peeled from the positive-electrode current collector. However, the positive-electrode mixture layer is adhered to the positive-electrode bonding layer by an anchor effect in which the conductive agent contained in the positive-electrode bonding layer enters the solid electrolyte and the positive-electrode active material that are contained in the positive-electrode mixture layer, and thus high adhesive strength is achieved. In addition, when the positive-electrode bonding layer contains the binder, the positive-electrode current collector is adhered to the positive-electrode bonding layer via the binder. The positive-electrode mixture layer is thus bonded to the positive-electrode current collector via the positive-electrode bonding layer with high adhesive strength. As the positive-electrode mixture layer does not contain the binder, battery characteristics are not decreased by the binder. It is thus possible to manufacture an all-solid battery with improved battery characteristics while the shape of the all-solid battery is maintained. In addition, by pressing the positive-electrode mixture layer, the solid electrolyte contained in the positive-electrode mixture layer can also be used as an adhesive material because of the anchor effect and intermolecular force due to close contact. The shape of the all-solid battery is thus easily maintained during manufacturing of the all-solid battery.

As the positive-electrode mixture layer does not contain the solvent, the solid electrolyte contained in the positive-electrode mixture layer is not degraded by the solvent, and the all-solid battery with improved battery characteristics can be manufactured.

A method of manufacturing an all-solid battery according to another aspect of the present disclosure is a method of manufacturing an all-solid battery that includes a negative-electrode layer that has a negative-electrode mixture layer in which a concentration of a solvent is less than or equal to 50 ppm and a concentration of a binder is less than or equal to 100 ppm, a positive-electrode layer that has a positive-electrode mixture layer, and a solid electrolyte layer. The method includes forming a negative-electrode bonding layer that contains at least a second conductive agent on a negative-electrode current collector, applying negative-electrode mixture powder that contains at least a solid electrolyte and a negative-electrode active material on the negative-electrode bonding layer, pressing the negative-electrode mixture powder from above and below in a stacking direction together with the negative-electrode current collector and the negative-electrode bonding layer to form a negative-electrode layer that is an integrated body of the negative-electrode current collector, the negative-electrode bonding layer, and the negative-electrode mixture layer, and forming an all-solid battery using the negative-electrode layer.

An all-solid battery in which the negative-electrode mixture layer that does not contain the binder is bonded to the negative-electrode current collector via the negative-electrode bonding layer is manufactured. When the negative-electrode mixture layer does not contain the binder, the adhesive strength with the negative-electrode current collector is low and thus the negative-electrode mixture layer is easily peeled from the negative-electrode current collector.

However, the negative-electrode mixture layer is adhered to the negative-electrode bonding layer by an anchor effect in which the conductive agent contained in the negative-electrode bonding layer enters the solid electrolyte and the negative-electrode active material that are contained in the negative-electrode mixture layer and by intermolecular force due to close contact of the solid electrolyte and the negative-electrode active material, and thus high adhesive strength is achieved. In addition, when the negative-electrode bonding layer contains the binder, the negative-electrode current collector is adhered to the negative-electrode bonding layer via the binder. The negative-electrode mixture layer is thus bonded to the negative-electrode current collector via the negative-electrode bonding layer with high adhesive strength. As the negative-electrode mixture layer does not contain the binder, battery characteristics are not decreased by the binder. It is thus possible to manufacture an all-solid battery with improved battery characteristics while the shape of the all-solid battery is maintained.

In addition, by pressing the negative-electrode mixture layer, the solid electrolyte and the negative-electrode active material that are contained in the negative-electrode mixture layer can also be used as an adhesive material because of the anchor effect and the intermolecular force due to close contact. The shape of the all-solid battery is thus easily maintained during manufacturing of the all-solid battery.

As the negative-electrode mixture layer does not contain the solvent, the solid electrolyte contained in the negative-electrode mixture layer is not degraded by the solvent, and the all-solid battery with improved battery characteristics can be manufactured.

The method of manufacturing an all-solid battery, for example, may further include applying solid electrolyte powder on at least one of the positive-electrode mixture layer of the positive-electrode layer and the negative-electrode mixture layer of the negative-electrode layer and pressing the positive-electrode layer and the negative-electrode layer on which the solid electrolyte powder is applied from above and below in a stacking direction to form a solid electrolyte layer that is integrated with at least one of the positive-electrode layer and the negative-electrode layer on which the solid electrolyte powder is applied. A concentration of a solvent contained in the solid electrolyte layer may be less than or equal to 50 ppm and a concentration of a binder contained in the solid electrolyte layer may be less than or equal to 100 ppm.

As the solid electrolyte layer does not contain the binder, battery characteristics are not decreased by the binder, and the all-solid battery with improved battery characteristics can be manufactured. As the solid electrolyte layer does not contain the solvent, the solid electrolyte contained in the solid electrolyte layer is not degraded by the solvent, and the all-solid battery with improved battery characteristics can be manufactured.

In addition, by pressing the solid electrolyte layer, the solid electrolyte contained in the solid electrolyte layer can also be used as an adhesive material because of the anchor effect and the intermolecular force due to close contact. The shape of the all-solid battery is thus easily maintained during manufacturing of the all-solid battery.

In the method of manufacturing an all-solid battery, for example, a time to press the positive-electrode mixture powder may be less than or equal to 5 seconds.

Acceleration of sintering of the solid electrolyte in the positive-electrode mixture layer due to pressing is prevented. Consequently, when the solid electrolyte layer is stacked on the positive-electrode mixture layer, adhesive strength hardly decreases. A state where the positive-electrode mixture layer is easily deformed is also maintained. It is possible to prevent peeling at an interface between the positive-electrode mixture layer and the solid electrolyte layer, and an opening from being formed at the interface, and thus a decrease in battery characteristics due to hindering ion conduction is prevented. The all-solid battery with improved battery characteristics can be manufactured while the shape of the all-solid battery is maintained.

In the method of manufacturing an all-solid battery, for example, a time to press the negative-electrode mixture powder may be less than or equal to 5 seconds.

Acceleration of sintering of the solid electrolyte in the negative-electrode mixture layer due to pressing is prevented. Consequently, when the solid electrolyte layer is stacked on the negative-electrode mixture layer, adhesive strength hardly decreases. It is possible to prevent peeling at an interface between the negative-electrode mixture layer and the solid electrolyte layer, and thus a decrease in battery characteristics due to hindering ion conduction is prevented. The all-solid battery with improved battery characteristics can be manufactured while the shape of the all-solid battery is maintained.

In the method of manufacturing an all-solid battery, for example, a time to press the solid electrolyte powder may be less than or equal to 5 seconds.

Acceleration of sintering of the solid electrolyte in the solid electrolyte layer due to pressing is prevented. Consequently, when the solid electrolyte layer is stacked on the solid electrolyte layer, adhesive strength hardly decreases. It is possible to prevent peeling at an interface between the solid electrolyte layers, and thus a decrease in battery characteristics due to hindering ion conduction is prevented. The all-solid battery with improved battery characteristics can be manufactured while the shape of the all-solid battery is maintained.

Hereinafter, an all-solid battery according to an embodiment of the present disclosure will be described with reference to the drawings. The following embodiment shows one specific example of the present disclosure, and numerical values, shapes, materials, components, arrangement positions and connection forms of the components, and the like are examples, and the present disclosure is not limited thereto. In addition, among components in the following embodiment, components that are not described in independent claims indicating the highest concept of the present disclosure are described as optional components.

Moreover, each drawing is a schematic view in which emphasis, omission, or adjustment of ratio is appropriately performed to illustrate the present disclosure, and is not necessarily strictly illustrated, and may be different from the actual shape, positional relationship, and ratio. In the drawings, substantially the same components are denoted by the same reference numerals, and redundant description may be omitted or simplified.

In the present specification, a term indicating a relationship between elements such as parallel, a term indicating the shape of an element such as flat and a rectangle, and a numerical range are not limited to expressions representing only strict meanings, but are expressions that are meant to include substantially equivalent ranges, for example, differences of several % or so.

In addition, "planar view" in the present specification means a case where the all-solid battery is viewed along a stacking direction of the all-solid battery, and "thickness" in the present specification is a length of the all-solid battery and each layer in the stacking direction.

In the present specification, the terms "upper" and "lower" in the configuration of the all-solid battery do not refer to the upward direction (vertically upward) and downward direction (vertically downward) in absolute space recognition, but is used as terms defined by a relative positional relationship based on a stacking order in a stacked configuration. Further, the terms "upper" and "lower" are used not only in a case where two components are spaced apart from one another and another component is present between the two components, but also in a case where two components are placed in close contact with each other to make the two components contact.

In the present specification, the cross-sectional view is a view illustrating a cross-section when a central portion of the all-solid battery is cut in the stacking direction.

Exemplary Embodiment

Hereinafter, an all-solid battery, and a positive-electrode layer, a negative-electrode layer, and a solid electrolyte layer constituting the all-solid battery according to the present exemplary embodiment will be described in detail with reference to the drawings.

[A. All-Solid Battery]

All-solid battery 100 according to the present exemplary embodiment will be described with reference to FIG. 1. FIG. 1 is a schematic cross-sectional view of all-solid battery 100 according to the present exemplary embodiment.

As illustrated in FIG. 1, all-solid battery 100 according to the present exemplary embodiment includes, for example, positive-electrode layer 20, negative-electrode layer 30, and solid electrolyte layer 40. Positive-electrode layer 20 includes positive-electrode current collector 6, positive-electrode bonding layer 4 that is formed on positive-electrode current collector 6, and positive-electrode mixture layer 21 that is formed on positive-electrode bonding layer 4 and contains solid electrolyte 1 and positive-electrode active material 2. Negative-electrode layer 30 includes negative-electrode current collector 7, negative-electrode bonding layer 5 that is formed on negative-electrode current collector 7, and negative-electrode mixture layer 31 that is formed on negative-electrode bonding layer 5 and contains solid electrolyte 1 and negative-electrode active material 3. Solid electrolyte layer 40 is disposed between positive-electrode mixture layer 21 and negative-electrode mixture layer 31 and contains at least solid electrolyte 1 having ion conductivity. Positive-electrode mixture layer 21 and negative-electrode mixture layer 31 are formed on positive-electrode bonding layer 4 that is formed on positive-electrode current collector 6 and on negative-electrode bonding layer 5 that is formed on negative-electrode current collector 7, respectively. All-solid battery 100 is configured to stack positive-electrode current collector 6, positive-electrode bonding layer 4, positive-electrode mixture layer 21, solid electrolyte layer 40, negative-electrode mixture layer 31, negative-electrode bonding layer 5, and negative-electrode current collector 7 in this order.

That is, all-solid battery 100 includes positive-electrode layer 20 that includes (i) positive-electrode current collector 6, (ii) positive-electrode bonding layer 4 that contains at least a conductive agent comprising non-metal and is formed on positive-electrode current collector 6, and (iii) positive-electrode mixture layer 21 that contains at least positive-electrode active material 2 and solid electrolyte 1 having ion conductivity and is formed on positive-electrode bonding layer 4. Further, all-solid battery 100 includes negative-electrode layer 30 that includes (i) negative-electrode current collector 7, (ii) negative-electrode bonding layer 5 that contains at least a conductive agent comprising non-metal and is formed on negative-electrode current collector, 7 and (iii) negative-electrode mixture layer 31 that contains at least negative-electrode active material 3 and solid electrolyte 1 having ion conductivity and is formed on negative-electrode bonding layer 5. Moreover, all-solid battery 100 includes solid electrolyte layer 40 that is disposed between positive-electrode mixture layer 21 and negative-electrode mixture layer 31 and contains at least solid electrolyte 1 having ion conductivity.

A concentration of a binder contained in positive-electrode mixture layer 21 is less than or equal to 100 ppm and a concentration of a solvent contained in positive-electrode mixture layer 21 is less than or equal to 50 ppm.

The concentration of a binder contained in negative-electrode mixture layer 31 is less than or equal to 100 ppm and the concentration of a solvent contained in negative-electrode mixture layer 31 is less than or equal to 50 ppm.

As described above, in all-solid battery 100, the concentration of the binder contained in positive-electrode mixture layer 21 is preferably less than or equal to 100 ppm and the concentration of the solvent contained in positive-electrode mixture layer 21 is preferably less than or equal to 50 ppm. In addition, the concentration of the binder contained in negative-electrode mixture layer 31 is preferably less than or equal to 100 ppm and the concentration of the solvent contained in negative-electrode mixture layer 31 is preferably less than or equal to 50 ppm.

In the present specification, the conductive agent is an example of a first conductive agent and a second conductive agent.

Positive-electrode layer 20, negative-electrode layer 30, and solid electrolyte layer 40 will be described in detail later.

[A-1. Binder]

In all-solid battery 100 according to the present exemplary embodiment, positive-electrode mixture layer 21 does not contain a binder. Specifically, the binder is an organic material that does not have ion conductivity or electron conductivity and hinders charge-discharge characteristics of the all-solid battery. The binder is an adhesive material that makes materials in positive-electrode mixture layer 21 adhere to each other and makes positive-electrode mixture layer 21 adhere to other layers.

Negative-electrode mixture layer 31 does not contain the binder.

As the ion conductivity and electron conductivity of all-solid battery 100 are not hindered, it is possible to achieve all-solid battery 100 with good charge-discharge characteristics.

In the present specification, the expression "binder is not contained" means that the binder is not substantially contained, that is, the concentration of the binder contained in positive-electrode mixture layer 21 and negative-electrode mixture layer 31 is less than or equal to 100 ppm.

An average concentration of the binder in positive-electrode mixture layer 21 per arbitrary unit volume is preferably less than or equal to 100 ppm. That is, the concentration of the binder in positive-electrode mixture layer 21 is preferably less than or equal to 100 ppm as a whole. The description "concentration of binder in positive-electrode mixture layer 21 is less than or equal to 100 ppm as a whole" means that when positive-electrode mixture layer 21 is divided into arbitrary unit volumes, the concentration of the binder is less than or equal to 100 ppm in each unit volume. That is, the description means that positive-electrode mixture layer 21 does not include a portion with a binder concentration higher than 100 ppm, the binder is uniformly distributed in positive-electrode mixture layer 21, and positive-electrode mixture layer 21 does not substantially contain the binder as a whole. In this case, as the concentration of the binder in entire positive-electrode mixture layer 21 is less than or equal to 100 ppm, positive-electrode mixture layer 21 does not substantially contain the binder as a whole and the ion conduction and electron conduction of all-solid battery 100 are hardly hindered.

In the present specification, the concentration refers to concentration by weight unless otherwise noted.

A method of measuring the binder is not particularly limited, and for example, gas chromatography, mass change method, and the like can be used.

[A-2. Conductive Assistant]

In all-solid battery 100 according to the present exemplary embodiment, positive-electrode mixture layer 21 may contain a conductive assistant if needed. As a result, it is possible to improve the electron conductivity of positive-electrode mixture layer 21 during charging and discharging and thus to achieve good charge-discharge characteristics in all-solid battery 100.

In addition, in all-solid battery 100, negative-electrode mixture layer 31 may also contain the conductive assistant if needed. As a result, it is possible to improve the electron conductivity of negative-electrode mixture layer 31 during charging and discharging and thus to achieve good charge-discharge characteristics in all-solid battery 100.

[A-3. Solvent]

In all-solid battery 100 according to the present exemplary embodiment, the concentration of a solvent (specifically, organic solvent) contained in positive-electrode mixture layer 21 is less than or equal to 50 ppm. That is, positive-electrode mixture layer 21 does not contain the solvent.

In all-solid battery 100, the concentration of a solvent (specifically, organic solvent) contained in negative-electrode mixture layer 31 is less than or equal to 50 ppm. That is, negative-electrode mixture layer 31 does not contain the solvent.

In all-solid battery 100, the concentration of a solvent (specifically, organic solvent) contained in solid electrolyte layer 40 may be less than or equal to 50 ppm. That is, solid electrolyte layer 40 does not need to contain the solvent.

In the present specification, the expression "solvent is not contained" means that the solvent is not substantially contained, that is, the concentration of the solvent contained in positive-electrode mixture layer 21, negative-electrode mixture layer 31, and solid electrolyte layer 40 is less than or equal to 50 ppm.

A method of measuring the organic solvent is not particularly limited, and for example, gas chromatography, mass change method, and the like can be used.

Examples of the organic solvent may include a nonpolar organic solvent, a polar solvent, and a combination thereof. Examples of the nonpolar organic solvent may include heptane, xylene, toluene, and combinations thereof. Examples of the polar organic solvent may include a tertiary amine solvent, an ether solvent, a thiol solvent, an ester solvent, and combinations thereof. Examples of the tertiary amine solvent may include triethylamine, tributylamine, and triamylamine. Examples of the ether solvent may include tetrahydrofuran and cyclopentyl methyl ether. Examples of the thiol solvent may include ethane mercaptan. Examples of the ester solvent may include butyl butyrate, butyl acetate, and combinations thereof.

Examples of the organic solvent used for preparing slurry for a positive-electrode mixture and a negative-electrode mixture may include heptane, toluene, and hexane of a hydrocarbon-based organic solvent. Preferably, a hydrocarbon-based organic solvent having a reduced moisture content by performing a dehydration treatment is used.

[B. Positive-Electrode Layer]

Positive-electrode layer 20 of the present exemplary embodiment will be described with reference to FIG. 1.

Positive-electrode layer 20 of the present exemplary embodiment includes, for example, positive-electrode current collector 6 that comprises a metal foil, positive-electrode bonding layer 4 that is formed on positive-electrode current collector 6, and positive-electrode mixture layer 21 that is formed on positive-electrode bonding layer 4.

[B-1. Positive-Electrode Mixture Layer]

It is only required that positive-electrode mixture layer 21 contains at least positive-electrode active material 2 and solid electrolyte 1. As illustrated in FIG. 1, in all-solid battery 100 according to the present exemplary embodiment, positive-electrode mixture layer 21 contains, for example, solid electrolyte 1 and positive-electrode active material 2. Positive-electrode mixture layer 21 does not contain a binder. This means that the concentration of the binder is less than or equal to 100 ppm.

In addition, positive-electrode mixture layer 21 may contain a conductive assistant if needed.

[B-1-1. Binder]

In all-solid battery 100 according to the present exemplary embodiment, positive-electrode mixture layer 21 does not contain a binder.

The binder is an organic material that does not have ion conductivity and electron conductivity and decreases charge-discharge characteristics of the all-solid battery. The binder is also an adhesive material that functions to make materials in positive-electrode mixture layer 21 adhere to each other and make the positive-electrode mixture layer adhere to other layers.

As positive-electrode mixture layer 21 does not contain the binder, the ion conductivity and electron conductivity of all-solid battery 100 are not hindered. Consequently, it is possible to achieve all-solid battery 100 with good charge-discharge characteristics.

Specifically, examples of the binder include synthetic rubber such as butadiene rubber, isoprene rubber, styrene-butadiene rubber (SBR), styrene-butadiene-styrene copolymer (SBS), styrene-ethylene-butadiene-styrene copolymer (SEBS), ethylene-propylene rubber, butyl rubber, chloroprene rubber, acrylonitrile-butadiene rubber, acrylic rubber, silicone rubber, fluorine rubber and urethane rubber, and polyvinylidene fluoride (PVDF), polyvinylidene fluoride-hexafluoropropylene copolymer (PVDF-HFP), polyimide, polyamide, polyamide imide, polyvinyl alcohol, and chlorinated polyethylene (CPE).

As positive-electrode mixture layer 21 does not contain the binder functioning as an adhesive material, solid electrolyte 1 is used as the adhesive material.

Solid electrolyte 1 is adhered to positive-electrode active material 2 in positive-electrode mixture layer 21 by an anchor effect in which solid electrolyte 1 enters positive-electrode active material 2.

Solid electrolytes 1 in positive-electrode mixture layer 21 are adhered to each other by sintering.

Positive-electrode mixture layer 21 is adhered to solid electrolyte layer 40 by sintering solid electrolytes 1 in these layers. Positive-electrode mixture layer 21 is also adhered to solid electrolyte layer 40 by solid electrolyte 1 contained in solid electrolyte layer 40 entering positive-electrode active material 2 contained in positive-electrode mixture layer 21.

Adhesion of positive-electrode mixture layer 21 to positive-electrode bonding layer 4 will be described later in the section [B-2. Positive-electrode bonding layer].

Maintaining the shape of positive-electrode layer 20 during a manufacturing process in a case where positive-electrode layer 20 does not contain the binder will be described later in a manufacturing method.

[B-1-2. Conductive Assistant]

Hereinafter, a conductive assistant of the present exemplary embodiment will be described.

In all-solid battery 100 according to the present exemplary embodiment, positive-electrode mixture layer 21 may contain a conductive assistant.

Electron conductivity in positive-electrode mixture layer 21 can be increased, and thus an electron conduction path in positive-electrode mixture layer 21 can be secured and internal resistance of all-solid battery 100 can be reduced. Consequently, an amount of current that can flow through the electron conduction path increases, and thus charge-discharge characteristics of all-solid battery 100 are improved.

The conductive assistant of the present exemplary embodiment is not particularly limited as long as the conductive assistant improves the electron conductivity of positive-electrode mixture layer 21, but conductive carbon materials such as acetylene black, ketjen black, carbon black, graphite, and carbon fiber can be used. The conductive assistant may be used alone or in combination of two or more types thereof.

[B-1-3. Positive-Electrode Active Material]

Hereinafter, positive-electrode active material 2 of the present exemplary embodiment will be described.

Positive-electrode active material 2 is a material that intercalates or deintercalates metal ions such as lithium (Li) ions in a crystalline structure at a higher potential than that of negative-electrode layer 30 to be oxidized or reduced with the intercalation or deintercalation of the metal ions such as lithium ions. A type of positive-electrode active material 2 is appropriately selected according to the type of all-solid battery 100, and examples thereof include an oxide active material and a sulfide active material.

For example, an oxide active material (lithium-containing transition metal oxide) is used as positive-electrode active material 2 in the present exemplary embodiment. Examples of the oxide active material include $LiCoO_2$, $LiNiO_2$, $LiMn_2O_4$, $LiCoPO_4$, $LiNiPO_4$, $LiFePO_4$, $LiMnPO_4$, and compounds obtained by substituting transition metal of these compounds with one or two different elements. Examples of the compound obtained by substituting the transition metal of the above-described compounds with one or two different elements include known materials such as $LiNi_{1/3}Co_{1/3}Mn_{1/3}O_2$, $LiNi_{0.8}Co_{0.15}Al_{0.05}O_2$, and $LiNi_{0.5}Mn_{1.5}O_2$. Positive-electrode active material 2 may be used alone or in combination of two or more types thereof.

Examples of the shape of the positive-electrode active material include particle and thin film shapes. In a case where the positive-electrode active material is particle shape, an average particle diameter ($D_{50}$) of the positive-electrode active material is, for example, preferably in a range of 50 nm to 50 μm inclusive, and more preferably in a range of 1 μm to 15 μm inclusive. As the average particle diameter of the positive-electrode active material is more than or equal to 50 nm, good handling property is achieved. As the average particle diameter of the positive-electrode active material is less than or equal to 50 μm, a flat positive-electrode layer is easily obtained. Consequently, the range of 50 nm to 50 μm inclusive is preferable. "Average particle diameter" in the present specification is a volume-based average diameter measured by a laser analysis and scattering particle density distribution measuring device.

A content of positive-electrode active material 2 in positive-electrode mixture layer 21 is not particularly limited and, for example, is preferably in a range of 40 wt % to 99 wt % inclusive, and more preferably in a range of 70 wt % to 95 wt % inclusive.

A surface of positive-electrode active material 2 may be coated with a coating layer. This is because a reaction between positive-electrode active material 2 (for example, oxide active material) and solid electrolyte 1 (for example, sulfide-based solid electrolyte) can be suppressed. Examples of a material of the coating layer include Li ion conductive oxides such as $LiNbO_3$, $Li_3PO_4$, and LiPON. An average thickness of the coating layer is, for example, preferably in a range of 1 nm to 20 nm inclusive, and more preferably in a range of 1 nm to 10 nm inclusive.

Regarding a ratio of positive-electrode active material 2 and solid electrolyte 1 contained in positive-electrode mixture layer 21, when a value obtained by dividing a weight of the positive-electrode active material by a weight of the solid electrolyte is defined as a weight ratio, the weight ratio is preferably in a range of 1 to 19 inclusive, and more preferably in a range of 2.3 to 19 inclusive. A reason why the weight ratio is preferably in the above-described ranges is that both a lithium ion conduction path and an electron conduction path are easily secured in positive-electrode mixture layer 21.

[B-1-4. Solid Electrolyte]

Hereinafter, solid electrolyte 1 of the present exemplary embodiment will be described.

As illustrated in FIG. 1, positive-electrode mixture layer 21 of the present exemplary embodiment contains positive-electrode active material 2 and solid electrolyte 1. Solid electrolyte 1 may be appropriately selected depending on a conductive ion species (for example, lithium ion) and can be roughly divided into, for example, a sulfide-based solid electrolyte and an oxide-based solid electrolyte.

The type of the sulfide-based solid electrolyte in the present exemplary embodiment is not particularly limited, and examples of the sulfide-based solid electrolyte include $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$. In particular, from the viewpoint of excellent lithium ion conductivity, it is preferable that the sulfide-based solid electrolyte contains Li, P, and S. The sulfide-based solid electrolyte may be used alone or in combination of two or more types thereof. In addition, the sulfide-based solid electrolyte may be crystalline, amorphous or glass-ceramic. The expression of "$Li_2S$—$P_2S_5$" means a sulfide-based solid electrolyte formed using a raw material composition containing $Li_2S$ and $P_2S_5$, and the same applies to other expressions.

In the present exemplary embodiment, one form of the sulfide-based solid electrolyte is a sulfide glass ceramic containing $Li_2S$ and $P_2S_5$. Regarding the ratio of $Li_2S$ and $P_2S_5$, when a value obtained by dividing a moles of $Li_2S$ by a moles of $P_2S_5$ is defined as a molar ratio, the molar ratio is preferably in a range of 2.3 to 4 inclusive, and more preferably in a range of 3 to 4 inclusive. A reason why the molar ratio is preferably in the above-described ranges is that a crystal structure having high ion conductivity can be obtained while a lithium concentration that affects battery characteristics is maintained.

Examples of the shape of the sulfide-based solid electrolyte in the present exemplary embodiment include particle shapes such as spherical and elliptical shapes, and thin film shapes. When the sulfide-based solid electrolyte material has a particle shape, the average particle diameter ($D_{50}$) of the sulfide-based solid electrolyte is not particularly limited, but is preferably less than or equal to 40 μm, more preferably less than or equal to 20 μm, and further preferably less than or equal to 10 μm because a filling rate in the positive-electrode layer is easily improved. On the other hand, the average particle diameter of the sulfate-based solid electrolyte is preferably more than or equal to 0.001 μm, and more preferably more than or equal to 0.01 μm. The average particle diameter can be determined by, for example, a particle size distribution analyzer and an image analysis using a scanning electron microscope (SEM).

Next, the oxide-based solid electrolyte of the present exemplary embodiment will be described. The type of the oxide-based solid electrolyte is not particularly limited, and examples of the oxide-based solid electrolyte include LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, and $Li_{1.5}Al_{0.5}Ge_{1.5}(PO_4)_3$. The oxide-based solid electrolyte may be used alone or in combination of two or more types thereof.

The type and particle diameter of solid electrolyte 1 contained in positive-electrode mixture layer 21, negative-electrode mixture layer 31, and solid electrolyte layer 40 may be different from layer to layer.

[B-2. Positive-Electrode Bonding Layer]

Positive-electrode bonding layer 4 of the present exemplary embodiment will be described.

Positive-electrode bonding layer 4 functions to bond positive-electrode current collector 6 and positive-electrode mixture layer 21 via positive-electrode bonding layer 4. Positive-electrode bonding layer 4 contains a conductive agent as a main component and also contains a binder.

When all-solid battery 100 does not have positive-electrode bonding layer 4, positive-electrode mixture layer 21 does not contain the binder, and thus adhesive strength of positive-electrode current collector 6 and positive-electrode mixture layer 21 is low and a problem such as peeling easily occurs at an interface. Higher adhesive strength is needed at the interface between positive-electrode current collector 6 and positive-electrode mixture layer 21. By using positive-electrode bonding layer 4, the adhesive strength is reinforced.

Figure 2:
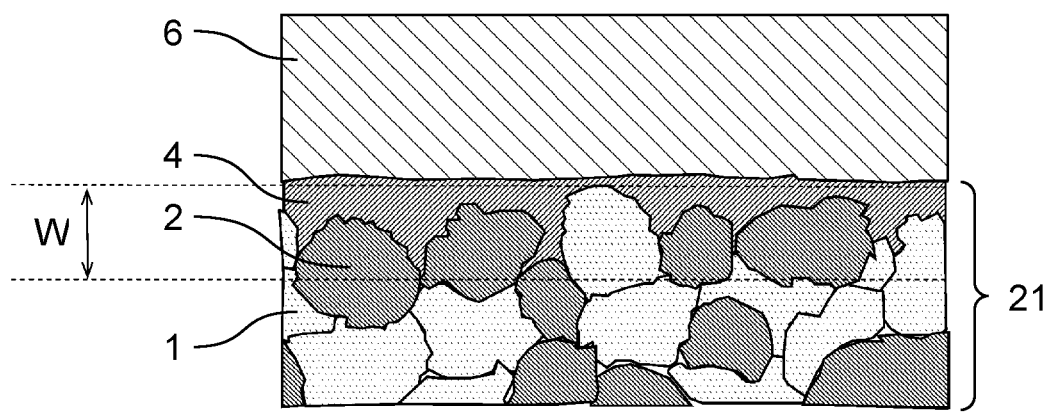
FIG. 2 is a schematic cross-sectional view of a positive-electrode layer of the present exemplary embodiment.
Figure 3:
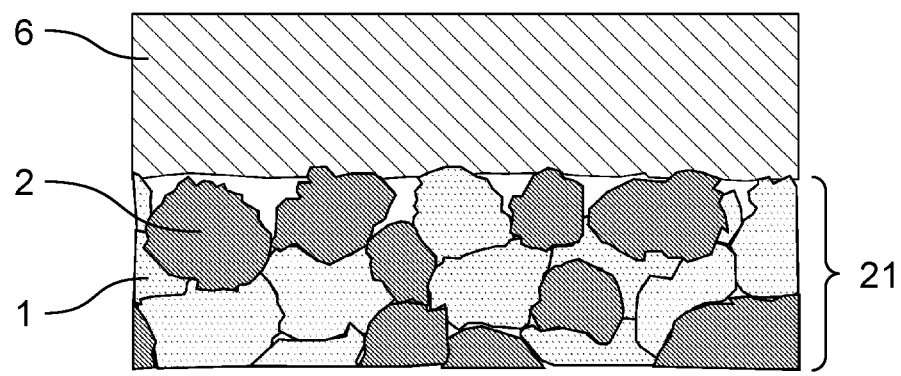
FIG. 3 is a schematic cross-sectional view of a conventional positive-electrode layer.

A state of adhesion of positive-electrode current collector 6 and positive-electrode mixture layer 21 will be described in detail with reference to FIGS. 2 and 3. FIG. 2 is a view illustrating a state where positive-electrode current collector 6 of the present exemplary embodiment is bonded to positive-electrode mixture layer 21 via positive-electrode bonding layer 4. FIG. 3 is a view of positive-electrode layer 20 in which positive-electrode bonding layer 4 is not present and positive-electrode current collector 6 is bonded to positive-electrode mixture layer 21 in a conventional example. FIGS. 2 and 3 are cross-sectional views of a bonding part of positive-electrode current collector 6 and positive-electrode mixture layer 21.

As illustrated in FIG. 2, a conductive agent in positive-electrode bonding layer 4 is plastically deformed to enter between positive-electrode active materials 2, between solid electrolytes 1, and between positive-electrode active material 2 and solid electrolyte 1 in positive-electrode mixture layer 21. With an anchor effect due to entering of the conductive agent, positive-electrode bonding layer 4 is mainly adhered to positive-electrode mixture layer 21, and sufficient adhesive strength for bonding positive-electrode bonding layer 4 to positive-electrode mixture layer 21 is obtained. As positive-electrode bonding layer 4 is softer than positive-electrode current collector 6, positive-electrode bonding layer 4 easily enters between positive-electrode active materials 2. For this reason, the anchor effect is further exhibited, and thus positive-electrode bonding layer 4 is bonded to positive-electrode mixture layer 21 with higher adhesive strength. Positive-electrode bonding layer 4 enters positive-electrode mixture layer 21, so that a region W where positive-electrode bonding layer 4 overlaps positive-electrode mixture layer 21 is formed. That is, as viewed from a direction perpendicular to a stacking direction, a part of at least one of positive-electrode active material 2 and solid electrolyte 1 contained in positive-electrode mixture layer 21 overlaps positive-electrode bonding layer 4. A stacking direction thickness of region W where positive-electrode mixture layer 21 overlaps positive-electrode bonding layer 4 is, for example, in a range of 1 μm to 10 μm, inclusive, and preferably in a range of 2 μm to 6 μm, inclusive.

The anchor effect refers to as a phenomenon in which a certain solid enters spaces in an adhered material (material to be bonded) or recesses and projections on a surface of the adhered material to be mechanically bonded to the adhered material. The anchor effect is also called a fastener effect. For example, when an opening of a recess of the adhered material is narrower than a bottom surface of the recess, the solid entering the recess of the adhered material is deformed according to the shape of the recess of the adhered material and is hardly removed from the recess of the adhered material due to the narrow opening. In this case, particularly higher anchor effect is expected.

In the present exemplary embodiment, as the conductive agent in positive-electrode bonding layer 4 enters recesses and projections formed on a surface of positive-electrode mixture layer 21 by positive-electrode active material 2 and solid electrolyte 1 (hereinafter, sometimes referred to as "large recesses and projections"), the anchor effect is exhibited and high adhesion is achieved. In addition, the anchor effect is also exhibited by the conductive agent in positive-electrode bonding layer 4 entering small recesses and projections on a surface of positive-electrode active material 2 in positive-electrode mixture layer 21 and small recesses and projections on a surface of solid electrolyte 1 in positive-electrode mixture layer 21. As described above, a higher anchor effect is obtained by the conductive agent entering the large recesses and projections and the small recesses and projections in positive-electrode mixture layer 21, and thus higher adhesive strength of positive-electrode bonding layer 4 and positive-electrode mixture layer 21 is achieved.

On the other hand, when positive-electrode bonding layer 4 is not present and positive-electrode current collector 6 is directly bonded to positive-electrode mixture layer 21 as illustrated in FIG. 3, positive-electrode current collector 6 is harder and less deformed than positive-electrode bonding layer 4. For this reason, positive-electrode current collector 6 cannot enter sufficiently between positive-electrode active materials 2, between solid electrolytes 1, and between positive-electrode active material 2 and solid electrolyte 1. The anchor effect cannot be obtained sufficiently, and thus adhesive strength of positive-electrode current collector 6 and positive-electrode mixture layer 21 is low. A stacking direction length of positive-electrode current collector 6 entering positive-electrode mixture layer 21 is, for example, less than 1 μm.

Conductive agents contained in positive-electrode bonding layer 4 of the present exemplary embodiment are adhered to each other via a binder contained in positive-electrode bonding layer 4, so that the shape of positive-electrode bonding layer 4 is maintained.

Positive-electrode bonding layer 4 is adhered to positive-electrode current collector 6 via the binder contained in positive-electrode bonding layer 4.

Electron conduction is performed between positive-electrode mixture layer 21 and positive-electrode current collector 6 via positive-electrode bonding layer 4. In all-solid battery 100, characteristics that are important for maintaining charge-discharge characteristics are ion conductivity and electron conductivity in positive-electrode mixture layer 21. Positive-electrode bonding layer 4 contains a conductive agent as a main component and has electron conductivity sufficient for maintaining the charge-discharge characteristics. For this reason, if positive-electrode bonding layer 4 contains a binder that decreases the electron conductivity, the binder does not affect the charge-discharge characteristics of all-solid battery 100.

Examples of the conductive agent include conductive carbon materials such as acetylene black, ketjen black, carbon black, graphite, and carbon fiber. The conductive agent may be used alone or in combination of two or more types thereof. As described above, a conductive agent formed of non-metal is used. As metal is not used for the conductive agent, problems such as a change in the potential of batteries and metal corrosion can be prevented.

Specifically, examples of the binder include synthetic rubber such as butadiene rubber, isoprene rubber, styrene-butadiene rubber (SBR), styrene-butadiene-styrene copolymer (SBS), styrene-ethylene-butadiene-styrene copolymer (SEBS), ethylene-propylene rubber, butyl rubber, chloroprene rubber, acrylonitrile-butadiene rubber, acrylic rubber, silicone rubber, fluorine rubber and urethane rubber, and polyvinylidene fluoride (PVDF), polyvinylidene fluoride-hexafluoropropylene copolymer (PVDF-HFP), polyimide, polyamide, polyamide imide, polyvinyl alcohol, and chlorinated polyethylene (CPE).

A weight per unit area of positive-electrode bonding layer 4 is preferably in a range of 0.1 g/m$^2$ to 10 g/m$^2$ inclusive. As the weight per unit area of positive-electrode bonding layer 4 is more than or equal to 0.1 g/m$^2$, the anchor effect is easily exhibited when positive-electrode bonding layer 4 is bonded to positive-electrode mixture layer 21 and high adhesive strength is achieved. It is thus possible to prevent interface peeling between positive-electrode bonding layer 4 and positive-electrode mixture layer 21.

As the weight per unit area of positive-electrode bonding layer 4 is less than or equal to 10 g/m$^2$, it is possible to prevent an increase in the amount of positive-electrode bonding layer 4 and at the same time, to increase adhesive strength of positive-electrode bonding layer 4 and positive-electrode mixture layer 21. As a result, costs can be reduced.

The weight per unit area of positive-electrode bonding layer 4 is more preferably in a range of 0.3 g/m$^2$ to 3 g/m$^2$ inclusive. As the weight per unit area of positive-electrode bonding layer 4 is more than or equal to 0.3 g/m$^2$, the adhesive strength of positive-electrode bonding layer 4 and positive-electrode mixture layer 21 becomes higher and the adhesive strength is maintained sufficiently at 3 g/m$^2$ or less.

The weight per unit area in the present disclosure is a weight per unit area of positive-electrode bonding layer 4 in a planar view, on a main surface of positive-electrode current collector 6 having positive-electrode bonding layer 4 formed thereon.

The thickness of positive-electrode bonding layer 4 is, for example, in a range of 1 μm to 10 μm inclusive, and preferably in a range of 2 μm to 6 μm inclusive. As the thickness of positive-electrode bonding layer 4 is more than or equal to 1 μm, the anchor effect is easily exhibited when positive-electrode bonding layer 4 is bonded to positive-electrode mixture layer 21 and high adhesive strength is achieved. It is thus possible to prevent interface peeling between positive-electrode bonding layer 4 and positive-electrode mixture layer 21. As the thickness of positive-electrode bonding layer 4 is less than or equal to 10 μm, it is possible to prevent the increase in the amount of positive-electrode bonding layer 4 and at the same time, to increase the adhesive strength of positive-electrode bonding layer 4 and positive-electrode mixture layer 21. As a result, costs can be reduced.

An amount of the binder contained in positive-electrode bonding layer 4 is preferably in a range of 0.1 wt % to 10 wt % inclusive. As the amount of the binder contained in positive-electrode bonding layer 4 is more than or equal to 0.1 wt %, positive-electrode bonding layer 4 is easily adhered to positive-electrode current collector 6 and interface peeling between positive-electrode bonding layer 4 and positive-electrode current collector 6 can be prevented. As the amount of the binder contained in positive-electrode bonding layer 4 is less than or equal to 10 wt %, the electron conductivity of positive-electrode bonding layer 4 hardly decreases and the charge-discharge characteristics of the all-solid battery are easily improved.

[B-3. Positive-Electrode Current Collector]

Positive-electrode layer 20 of the present exemplary embodiment includes positive-electrode current collector 6 comprising, for example, a metal foil. For positive-electrode current collector 6, for example, a foil-like body, a plate-like body, a mesh-like body, or the like comprising aluminum, gold, platinum, zinc, copper, SUS, nickel, tin, titanium, or an alloy of two or more thereof is used.

The thickness and shape of positive-electrode current collector 6 may be appropriately selected according to an application of an all-solid battery.

[C. Negative-Electrode Layer]

Negative-electrode layer 30 of the present exemplary embodiment will be described with reference to FIG. 1.

Negative-electrode layer 30 of the present exemplary embodiment includes, for example, negative-electrode current collector 7 that comprises a metal foil, negative-electrode bonding layer 5 that is formed on negative-electrode current collector 7, and negative-electrode mixture layer 31 that is formed on negative-electrode bonding layer 5.

[C-1. Negative-Electrode Mixture Layer]

It is only required that negative-electrode mixture layer 31 contains at least negative-electrode active material 3 and solid electrolyte 1. As illustrated in FIG. 1, in all-solid battery 100 according to the present exemplary embodiment, negative-electrode mixture layer 31 contains, for example, solid electrolyte 1 and negative-electrode active material 3. Negative-electrode mixture layer 31 does not contain a binder. This means that the concentration of the binder is less than or equal to 100 ppm.

In addition, negative-electrode mixture layer 31 may contain a conductive assistant if needed.

[C-1-1. Binder]

As for the type of the binder, the binder described above in the section [B. Positive-electrode layer] may be used, and thus the description thereof is omitted here.

Negative-electrode mixture layer 31 of the present exemplary embodiment does not contain a binder.

The binder is an organic material that does not have ion conductivity and electron conductivity and decreases charge-discharge characteristics of an all-solid battery. The binder is also an adhesive material that functions to make materials in negative-electrode mixture layer 31 adhere to each other and make the negative-electrode mixture layer adhere to other layers.

As negative-electrode mixture layer 31 does not contain the binder, the ion conductivity and electron conductivity of all-solid battery 100 are not hindered. Consequently, it is possible to achieve all-solid battery 100 with good charge-discharge characteristics.

As negative-electrode mixture layer 31 does not contain the binder functioning as an adhesive material, solid electrolyte 1 is used as the adhesive material. Solid electrolyte 1 and negative-electrode active material 3 in negative-electrode mixture layer 31 are adhered to each other by an anchor effect in which solid electrolyte 1 enters negative-electrode active material 3 and vice versa. As solid electrolyte 1 and negative-electrode active material 3 closely contact with each other, adhesive strength due to intermolecular force can also be obtained.

Solid electrolytes 1 in negative-electrode mixture layer 31 are adhered to each other by sintering.

Negative-electrode mixture layer 31 is adhered to solid electrolyte layer 40 by sintering solid electrolytes 1 in these layers. Negative-electrode mixture layer 31 is also adhered to solid electrolyte layer 40 by solid electrolyte 1 contained in solid electrolyte layer 40 entering negative-electrode active material 3 contained in negative-electrode mixture layer 31. As solid electrolyte 1 contained in solid electrolyte layer 40 closely contacts negative-electrode active material 3 contained in negative-electrode mixture layer 31, adhesive strength due to intermolecular force can also be obtained.

Adhesion of negative-electrode mixture layer 31 to negative-electrode bonding layer 5 will be described later in the section [C-2. Negative-electrode bonding layer].

Maintaining the shape of negative-electrode layer 30 during a manufacturing process in a case where negative-electrode layer 30 does not contain the binder will be described later in a manufacturing method.

[C-1-2. Conductive Assistant]

Hereinafter, a conductive assistant of the present exemplary embodiment will be described.

As for the type of conductive assistant, the conductive assistant described above in the section [B. Positive-electrode layer] may be used, and thus the description thereof is omitted here.

In all-solid battery 100 according to the present exemplary embodiment, negative-electrode mixture layer 31 may contain a conductive assistant. Electron conductivity in negative-electrode mixture layer 31 can be increased, and thus an electron conduction path in negative-electrode mixture layer 31 can be secured and internal resistance of all-solid battery 100 can be reduced. Consequently, the amount of current that can flow through the electron conduction path increases, and thus charge-discharge characteristics of all-solid battery 100 are improved.

[C-1-3. Negative-Electrode Active Material]

Negative-electrode active material 3 of the present exemplary embodiment will be described.

Negative-electrode active material 3 is a material that intercalates or deintercalates metal ions such as lithium ions in a crystalline structure at a lower potential than that of positive-electrode layer 20 to be oxidized or reduced with the intercalation or deintercalation of the metal ions such as lithium ions.

As negative-electrode active material 3 of the present exemplary embodiment, a well-known material can be used, and examples of the well-known material include a metal that can easily form an alloy with a lithium such as lithium, indium, tin, or silicon, a carbon material such as hard carbon or graphite, and an oxide active material such as $Li_4Ti_5O_{12}$ or $SiO_x$. In addition, a composite obtained by appropriately mixing the negative-electrode active materials described above may be used as the negative-electrode active material.

Regarding the ratio of negative-electrode active material 3 and solid electrolyte 1 contained in negative-electrode mixture layer 31, when a value obtained by dividing the weight of the negative-electrode active material by the weight of the solid electrolyte is defined as a weight ratio, the weight ratio is preferably in a range of 0.6 to 19 inclusive, and more preferably in a range of 1 to 5.7 inclusive. A reason why the weight ratio is preferably in the above-described ranges is that both a lithium ion conduction path and an electron conduction path are secured in negative-electrode mixture layer 31.

[C-1-4. Solid Electrolyte]

As solid electrolyte 1, the solid electrolyte described above in the section [B. Positive-electrode layer] may be used, and thus the description thereof is omitted here.

[C-2. Negative-Electrode Bonding Layer]

Negative-electrode bonding layer 5 of the present exemplary embodiment will be described.

Negative-electrode bonding layer 5 functions to adhere negative-electrode current collector 7 to negative-electrode mixture layer 31. Negative-electrode bonding layer 5 contains a conductive agent as a main component and also contains a binder.

When all-solid battery 100 does not have negative-electrode bonding layer 5, negative-electrode mixture layer 31 does not contain the binder. Adhesive strength of negative-electrode current collector 7 and negative-electrode mixture layer 31 is thus low and a problem such as peeling easily occurs at an interface. Higher adhesive strength is needed at the interface of negative-electrode current collector 7 and negative-electrode mixture layer 31. By using negative-electrode bonding layer 5, the adhesive strength is reinforced.

Figure 4:
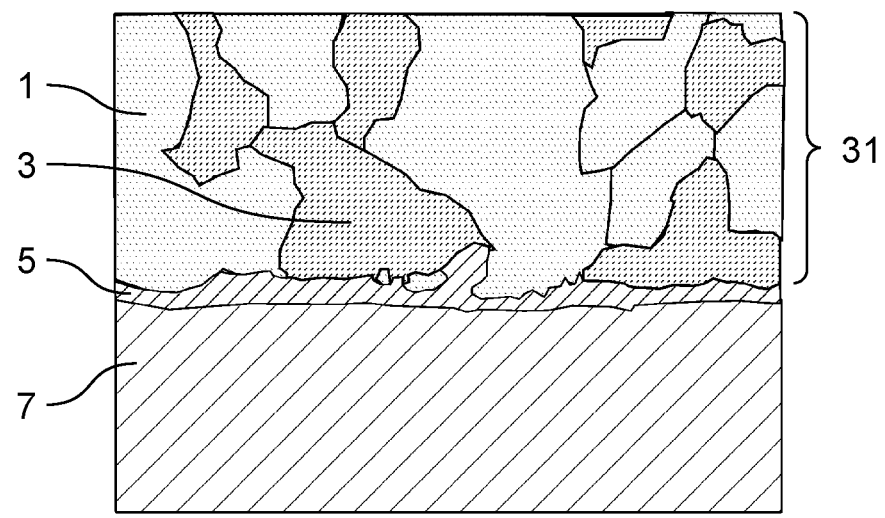
FIG. 4 is a schematic cross-sectional view of a negative-electrode layer of the present exemplary embodiment.
Figure 5:
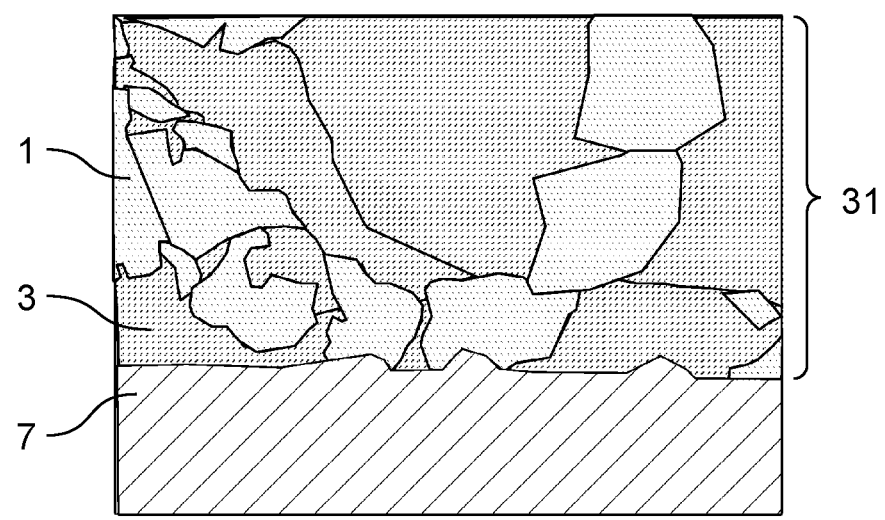
FIG. 5 is a schematic cross-sectional view illustrating a case where the negative-electrode layer of the present exemplary embodiment does not include a negative-electrode bonding layer.

A state of adhesion of negative-electrode current collector 7 and negative-electrode mixture layer 31 will be described in detail with reference to FIGS. 4 and 5. FIG. 4 is a view illustrating a state where negative-electrode current collector 7 of the present exemplary embodiment is bonded to negative-electrode mixture layer 31 via negative-electrode bonding layer 5. FIG. 5 is a view illustrating a state where negative-electrode current collector 7 is bonded to negative-electrode mixture layer 31 when negative-electrode layer 30 does not include negative-electrode bonding layer 5. FIGS. 4 and 5 are cross-sectional views of a bonding part of negative-electrode current collector 7 and negative-electrode mixture layer 31.

As illustrated in FIG. 4, a conductive agent in soft negative-electrode bonding layer 5 is plastically deformed to enter soft negative-electrode active material 3 and solid electrolyte 1 in negative-electrode mixture layer 31. With an anchor effect due to entering of the conductive agent, negative-electrode bonding layer 5 is adhered to negative-electrode mixture layer 31. In addition, the conductive agent in negative-electrode bonding layer 5 closely contacts negative-electrode active material 3 and solid electrolyte 1 contained in negative-electrode mixture layer 31. Negative-electrode bonding layer 5 and negative-electrode mixture layer 31 are also adhered to each other by intermolecular force due to the close contact. Sufficient adhesive strength of negative-electrode bonding layer 5 and negative-electrode mixture layer 31 is obtained by the anchor effect and the intermolecular force. When the conductive agent comprises metal, intermolecular force with other materials cannot be obtained. Non-metal is used as the conductive agent in the present exemplary embodiment. Consequently, negative-electrode bonding layer 5 and negative-electrode mixture layer 31 obtain the intermolecular force due to close contact of the conductive agent and negative-electrode active material 3 and solid electrolyte 1 that are contained in negative-electrode mixture layer 31.

On the other hand, when negative-electrode bonding layer 5 is not present and negative-electrode current collector 7 is directly bonded to negative-electrode mixture layer 31 as illustrated in FIG. 5, negative-electrode current collector 7 is bonded to negative-electrode mixture layer 31 by entering negative-electrode active material 3 and solid electrolyte 1. However, as negative-electrode current collector 7 does not have any recesses and projections and spaces, negative-electrode current collector 7 is easily removed from negative-electrode mixture layer 31 and adhesive strength due to the anchor effect is low. Moreover, negative-electrode current collector 7 comprises metal, and thus the intermolecular force with other materials is low. Consequently, the adhesive strength of negative-electrode current collector 7 and negative-electrode mixture layer 31 is low. However, negative-electrode active material 3 and solid electrolyte 1 that are contained in negative-electrode mixture layer 31 are soft. For this reason, negative-electrode active material 3 and solid electrolyte 1 are plastically deformed and thus negative-electrode mixture layer 31 is bonded to negative-electrode current collector 7 and high adhesion of negative-electrode mixture layer 31 and negative-electrode current collector 7 is achieved. It is thus possible to prevent peeling between negative-electrode mixture layer 31 and negative-electrode current collector 7.

Conductive agents contained in negative-electrode bonding layer 5 of the present exemplary embodiment are adhered to each other via a binder contained in negative-electrode bonding layer 5, so that the shape of negative-electrode bonding layer 5 is maintained.

Negative-electrode bonding layer 5 is adhered to negative-electrode current collector 7 via the binder contained in negative-electrode bonding layer 5.

Electron conduction is performed between negative-electrode mixture layer 31 and negative-electrode current collector 7 via negative-electrode bonding layer 5. In all-solid battery 100, characteristics that are important for maintaining charge-discharge characteristics are ion conductivity and electron conductivity in negative-electrode mixture layer 31. Negative-electrode bonding layer 5 contains a conductive agent as a main component and has electron conductivity sufficient for maintaining the charge-discharge characteristics. For this reason, if negative-electrode bonding layer 5 contains a binder that decreases the electron conductivity, the binder does not affect the charge-discharge characteristics of all-solid battery 100.

As for the type of the conductive agent and the binder, the binder and the conductive agent described above in the section [B. Positive-electrode layer] may be used, and thus the description thereof is omitted here.

A weight per unit area of negative-electrode bonding layer 5 is preferably in a range of 0.1 g/m$^2$ to 10 g/m$^2$ inclusive. As the weight per unit area of negative-electrode bonding layer 5 is more than or equal to 0.1 g/m$^2$, the anchor effect is easily exhibited when negative-electrode bonding layer 5 is bonded to negative-electrode mixture layer 31 and high adhesive strength is achieved. It is thus possible to prevent interface peeling between negative-electrode bonding layer 5 and negative-electrode mixture layer 31.

As the weight per unit area of negative-electrode bonding layer 5 is less than or equal to 10 g/m$^2$, it is possible to prevent an increase in the amount of negative-electrode bonding layer 5 and at the same time, to increase adhesive strength of negative-electrode bonding layer 5 and negative-electrode mixture layer 31. As a result, costs can be reduced.

The weight per unit area of negative-electrode bonding layer 5 is more preferably in a range of 0.3 g/m$^2$ to 3 g/m$^2$ inclusive. As the weight per unit area of negative-electrode bonding layer 5 is more than or equal to 0.3 g/m$^2$, the adhesive strength of negative-electrode bonding layer 5 and negative-electrode mixture layer 31 becomes higher and the adhesive strength is maintained sufficiently at 3 g/m$^2$ or less.

The amount of the binder contained in negative-electrode bonding layer 5 is preferably in a range of 0.1 wt % to 10 wt % inclusive. As the amount of the binder contained in negative-electrode bonding layer 5 is more than or equal to 0.1 wt %, negative-electrode bonding layer 5 is easily adhered to negative-electrode current collector 7, and interface peeling between negative-electrode bonding layer 5 and negative-electrode current collector 7 hardly occurs. As the amount of the binder contained in negative-electrode bonding layer 5 is less than or equal to 10 wt %, the electron conductivity of negative-electrode bonding layer 5 hardly decreases and the charge-discharge characteristics of the all-solid battery are easily improved.

[C-3. Negative-Electrode Current Collector]

Negative-electrode layer 30 of the present exemplary embodiment includes negative-electrode current collector 7 comprising, for example, a metal foil. For negative-electrode current collector 7, for example, a foil-like body, a plate-like body, a mesh-like body, or the like comprising SUS, gold, platinum, zinc, copper, nickel, titanium, tin, or an alloy of two or more thereof is used.

The thickness and shape of negative-electrode current collector 7 may be appropriately selected according to an application of an all-solid battery.

[D. Solid Electrolyte Layer]

Next, solid electrolyte layer 40 will be described. Solid electrolyte layer 40 of the present exemplary embodiment contains at least solid electrolyte 1 having lithium ion conductivity.

[D-1. Binder]

As for the type of the binder, the binder described above in the section [B. Positive-electrode layer] may be used, and thus the description thereof is omitted here.

The binder hinders lithium ion conduction of solid electrolyte layer 40 and decreases charge-discharge characteristics of all-solid battery 100. For this reason, it is preferable that solid electrolyte layer 40 does not contain the binder. This means that the content of the binder is less than or equal to 100 ppm.

When solid electrolyte layer 40 does not contain the binder, solid electrolyte 1 is used as an adhesive material. Solid electrolytes 1 are adhered to each other by sintering.

[D-2. Solid Electrolyte]

As solid electrolyte 1, the solid electrolyte described above in the section [B. Positive-electrode layer] may be used, and thus the description thereof is omitted here.

[E. Interface Between Positive-Electrode Mixture Layer and Solid Electrolyte Layer]

Figure 6:
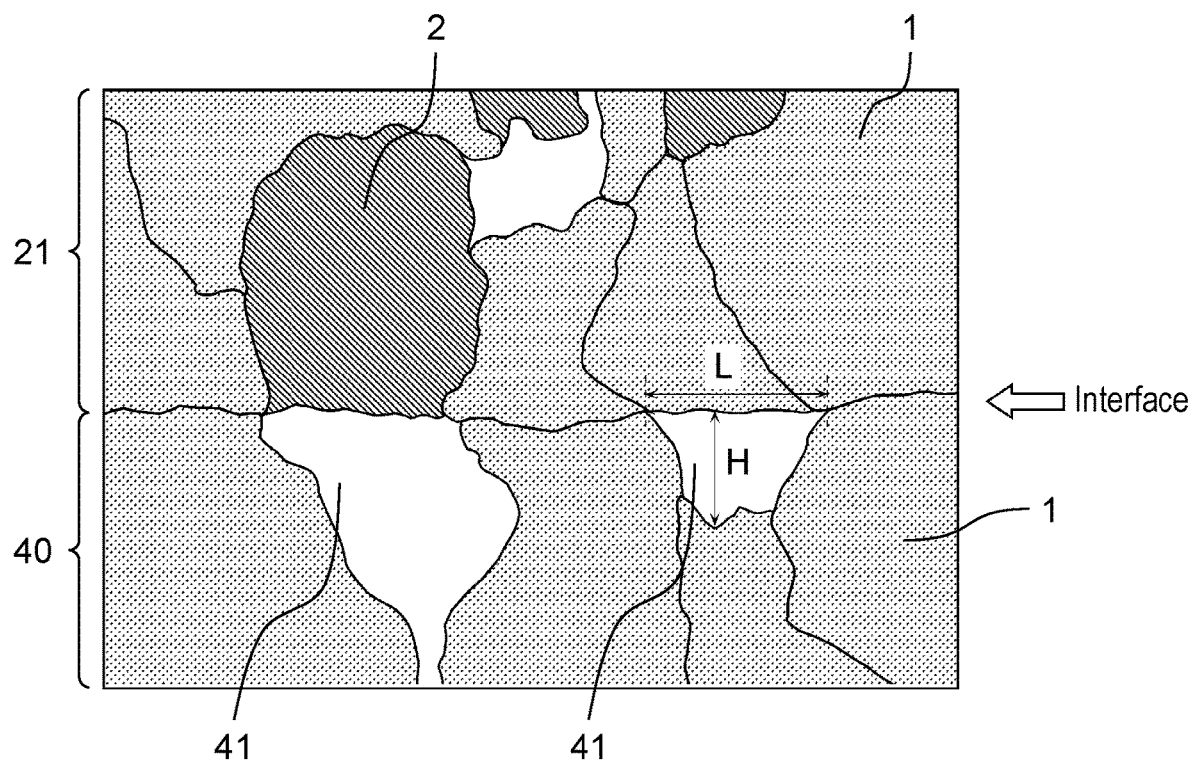
FIG. 6 is a schematic cross-sectional view illustrating a vicinity of an interface when an opening is present at an interface between the positive-electrode layer and a solid electrolyte layer in the all-solid battery according to the present exemplary embodiment.

FIG. 6 is a schematic cross-sectional view illustrating a vicinity of an interface between positive-electrode mixture layer 21 and solid electrolyte layer 40 when opening 41 is present at the interface between positive-electrode mixture layer 21 and solid electrolyte layer 40 in all-solid battery 100 according to the present exemplary embodiment.

In a cross-section of all-solid battery 100 taken along a stacking direction, opening 41 is a space that is formed at the interface between positive-electrode mixture layer 21 and solid electrolyte layer 40 so as to recess a surface of solid electrolyte layer 40. As illustrated in FIG. 6, opening 41 has side L that is a flat side along the interface between positive-electrode mixture layer 21 and solid electrolyte layer 40 and height H in a direction perpendicular to side L. Opening 41 is present at the interface between positive-electrode mixture layer 21 and solid electrolyte layer 40, and has L of 2 μm or more and H of 0.5 μm or more. In the present specification, the interface between positive-electrode mixture layer 21 and solid electrolyte layer 40 includes not only a surface that positive-electrode mixture layer 21 contacts solid electrolyte layer 40 but also a surface including opening 41. That is, opening 41 that is present at the interface between positive-electrode mixture layer 21 and solid electrolyte layer 40 is an opening that contacts the interface between positive-electrode mixture layer 21 and solid electrolyte layer 40. Opening 41 is also a space surrounded by a surface of positive-electrode mixture layer 21 closer to solid electrolyte layer 40 and a surface of solid electrolyte layer 40 closer to positive-electrode mixture layer 21.

Opening 41 tends to be formed when a press time is long in a positive-electrode layer integration step of pressing positive-electrode mixture powder from above and below in the stacking direction together with positive-electrode current collector 6 and positive-electrode bonding layer 4 to form positive-electrode layer 20 that is an integrated body of positive-electrode current collector 6, positive-electrode bonding layer 4, and positive-electrode mixture layer 21, in the section [G. Manufacturing method] to be described later. If the press time is long at this step, sintering of solid electrolyte 1 is accelerated and positive-electrode mixture layer 21 is hardly deformed. Consequently, in pressing at a subsequent step of integrating with solid electrolyte layer 40 and a subsequent stacking process, positive-electrode mixture layer 21 and solid electrolyte layer 40 hardly close contact with each other while being deformed. As a result, it is difficult to prevent opening 41 from being formed at the interface between positive-electrode mixture layer 21 and solid electrolyte layer 40. That is, as positive-electrode mixture layer 21 is hardly deformed, in pressing at the subsequent step of integrating with solid electrolyte layer 40 and the subsequent stacking process, a space having part L that is flat along the interface is easily formed at the interface between positive-electrode mixture layer 21 and solid electrolyte layer 40, and thus opening 41 is easily formed so as to recess the surface of solid electrolyte layer 40.

In the cross-section of all-solid battery 100 taken along the stacking direction, a number of openings 41 at the interface between positive-electrode mixture layer 21 and solid electrolyte layer 40 is preferably less than or equal to 3 per a length of the interface of 1 mm. In this case, the ion conductivity of positive-electrode mixture layer 21 and solid electrolyte 1 is hardly hindered and battery characteristics of all-solid battery 100 are easily improved. The number of openings 41 at the interface between positive-electrode mixture layer 21 and solid electrolyte layer 40 is more preferably less than or equal to 2, and further preferably less than or equal to 1 per a length of the interface of 1 mm. The number of openings 41 at the interface between positive-electrode mixture layer 21 and solid electrolyte layer 40 can be determined by, for example, counting openings 41 using an SEM image of a cross-section of all-solid battery 100 in a predetermined range.

It is particularly preferable that opening 41 is not present at the interface between positive-electrode mixture layer 21 and solid electrolyte layer 40. The number of openings 41 at the interface between positive-electrode mixture layer 21 and solid electrolyte layer 40 is particularly preferably 0 per a length of the interface of 1 mm. In this case, the ion conductivity of positive-electrode mixture layer 21 and solid electrolyte 1 is hardly hindered and the battery characteristics of all-solid battery 100 are particularly easily improved.

Figure 7:
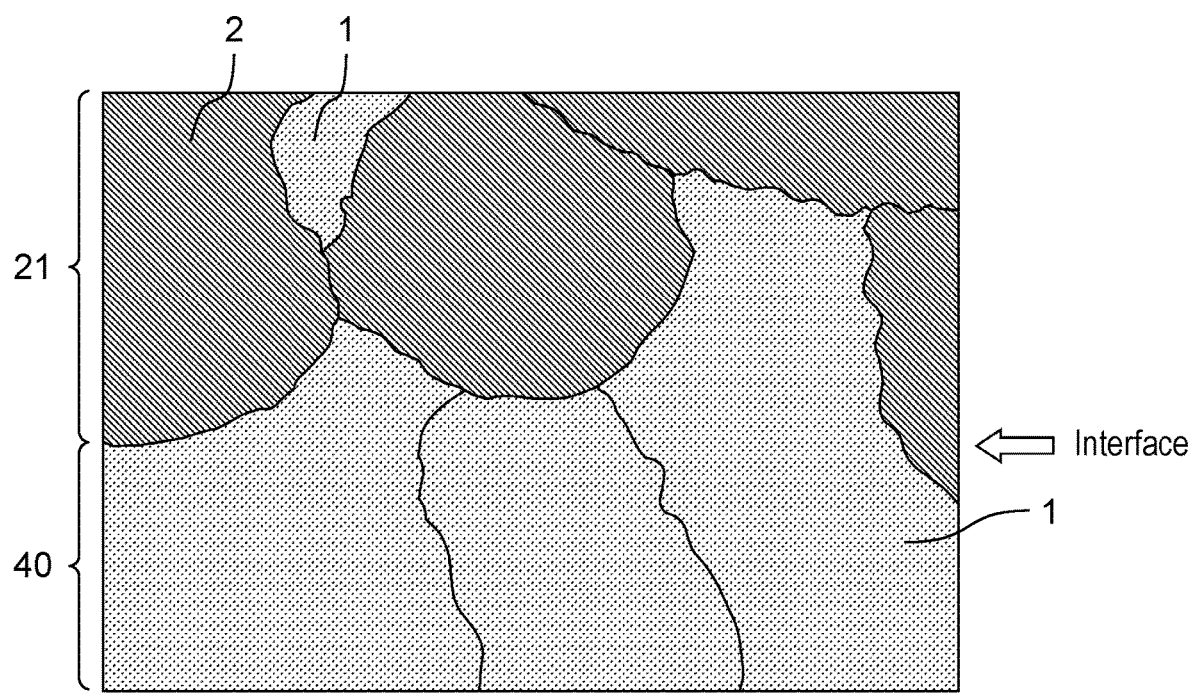
FIG. 7 is a schematic cross-sectional view illustrating the vicinity of the interface when an opening is not present at the interface between the positive-electrode layer and the solid electrolyte layer in the all-solid battery according to the present exemplary embodiment.

FIG. 7 is a schematic cross-sectional view illustrating the vicinity of the interface between positive-electrode mixture layer 21 and solid electrolyte layer 40 when opening 41 is not present at the interface between positive-electrode mixture layer 21 and solid electrolyte layer 40 in all-solid battery 100 according to the present exemplary embodiment. In FIG. 7, the interface between positive-electrode mixture layer 21 and solid electrolyte layer 40 is not flat, and positive-electrode mixture layer 21 and solid electrolyte layer 40 are deformed to closely contact with each other. When opening 41 is not formed along the interface between positive-electrode mixture layer 21 and solid electrolyte layer 40, battery characteristics are particularly easily improved.

The number of openings 41 at the interface can be adjusted by appropriately changing the press time at the positive-electrode layer integration step of pressing positive-electrode mixture powder from above and below in the stacking direction together with positive-electrode current collector 6 and positive-electrode bonding layer 4 to form positive-electrode layer 20 that is the integrated body of positive-electrode current collector 6, positive-electrode bonding layer 4, and positive-electrode mixture layer 21. When the press time is short, formation of opening 41 is easily prevented. When the press time is short at this step, a state where positive-electrode mixture layer 21 is easily deformed is maintained. Consequently, in pressing at a subsequent step of integrating with solid electrolyte layer 40 and a subsequent stacking process, positive-electrode mixture layer 21 and solid electrolyte layer 40 are easily deformed. It is thus possible to prevent opening 41 from being formed at the interface between positive-electrode mixture layer 21 and solid electrolyte layer 40.

[F. Other Configurations]

Although not illustrated, all-solid battery 100 according to the present exemplary embodiment may be attached by welding a terminal (metal positive-electrode lead) to a surface of positive-electrode current collector 6 opposite to positive-electrode mixture layer 21 or welding a terminal (metal negative-electrode lead) to a surface of negative-electrode current collector 7 opposite to negative-electrode mixture layer 31. A resultant all-solid battery having the terminals attached thereto or a battery group obtained by connecting a plurality of the all-solid batteries may be housed in a battery case, the positive-electrode lead and the negative-electrode lead are led out of the battery case, and the battery case may be sealed.

A bag formed of an aluminum laminate film or the like, and a case that comprises metal (for example, SUS, iron, and aluminum) or resin and has any shape are used as the battery case.

[G. Manufacturing Method]

[G-1. Method of Manufacturing All-Solid Battery]

Figure 8:
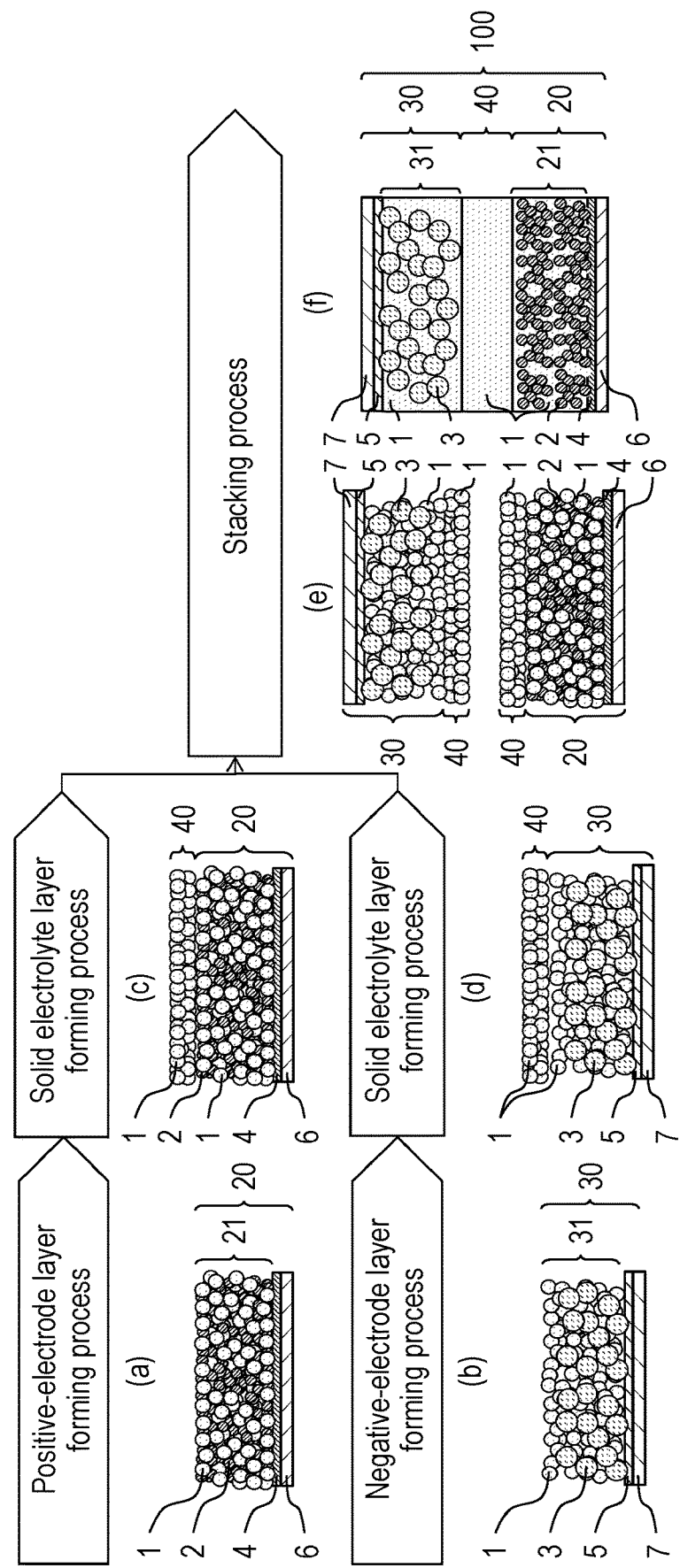
FIG. 8 is a schematic cross-sectional view illustrating a method of manufacturing an all-solid battery according to the present exemplary embodiment.

A method of manufacturing all-solid battery 100 according to the present exemplary embodiment will be described with reference to FIG. 8. FIG. 8 is a schematic cross-sectional view illustrating an example of the method of manufacturing all-solid battery 100.

All-solid battery 100 includes, for example, a positive-electrode layer forming process of preparing positive-electrode layer 20 (part (a) of FIG. 8), a negative-electrode layer forming process of preparing negative-electrode layer 30 (part (b) of FIG. 8), solid electrolyte layer forming process of preparing solid electrolyte layer 40 (part (c) and part (d) of FIG. 8), and a stacking process of stacking positive-electrode layer 20, negative-electrode layer 30, and solid electrolyte layer 40 prepared so as to dispose solid electrolyte layer 40 between positive-electrode mixture layer 21 and negative-electrode mixture layer 31 (part (e) and part (f) of FIG. 8).

The forming processes of preparing positive-electrode layer 20, negative-electrode layer 30, and solid electrolyte layer 40, respectively will be described later in the respective sections of methods of manufacturing the respective layers.

In the stacking process, positive-electrode layer 20, negative-electrode layer 30, and solid electrolyte layer 40 obtained by the respective forming processes are stacked so as to dispose solid electrolyte layer 40 between positive-electrode mixture layer 21 and negative-electrode mixture layer 31, and then are pressed from above positive-electrode current collector 6 and below negative-electrode current collector 7 in the stacking direction at, for example, 400 MPa. In this way, all-solid battery 100 is obtained. Bonding of solid electrolyte layers 40, bonding of positive-electrode layer 20 and solid electrolyte layer 40, and bonding of negative-electrode layer 30 and solid electrolyte layer 40 are strengthened by pressing. Bonding is also strengthened by heating all-solid battery 100 during pressing and accelerating sintering of solid electrolyte 1 contained in all-solid battery 100.

FIG. 8 illustrates a method of forming solid electrolyte layer 40 on positive-electrode layer 20 and negative-electrode layer 30 in the solid electrolyte layer forming process of preparing solid electrolyte layer 40. However, solid electrolyte layer 40 may be formed on one of positive-electrode layer 20 and negative-electrode layer 30.

[G-2. Method of Manufacturing Positive-Electrode Layer]

Figure 9:
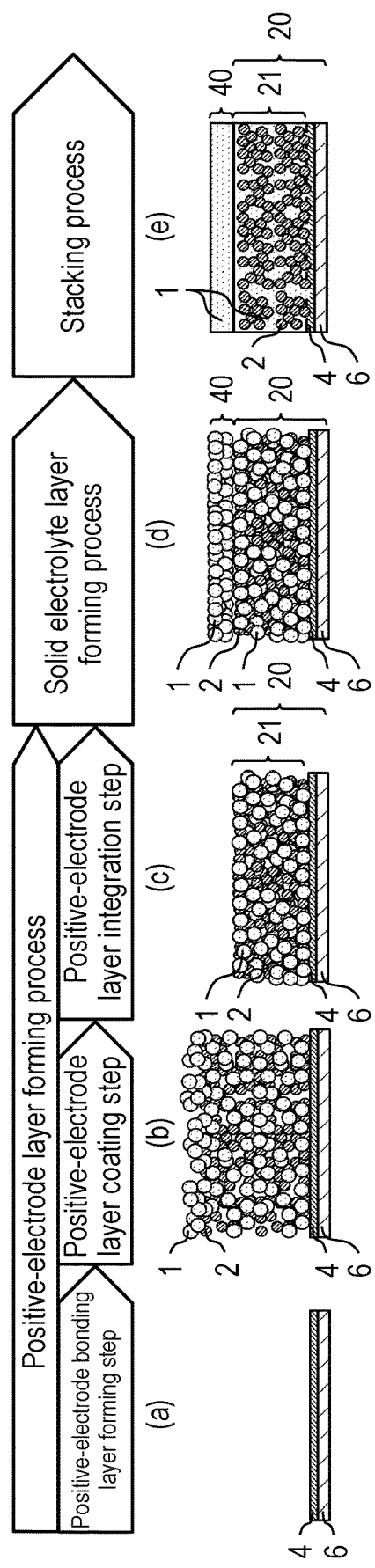
FIG. 9 is a schematic cross-sectional view illustrating a method of manufacturing a positive-electrode layer of the present exemplary embodiment.
Figure 10:
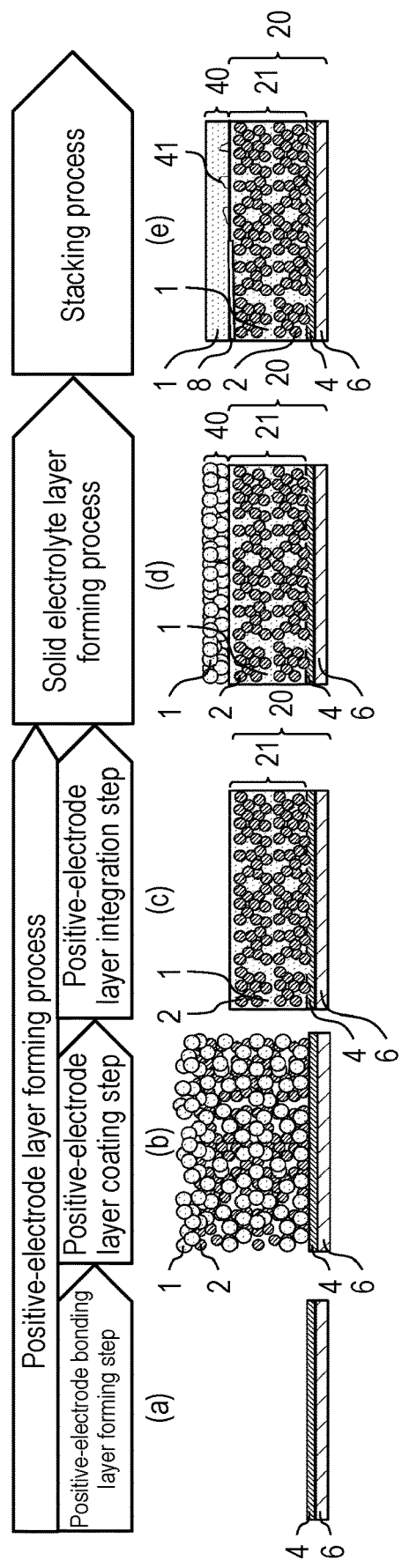
FIG. 10 is a schematic cross-sectional view illustrating a case where a press time is long in the method of manufacturing a positive-electrode layer of the present exemplary embodiment.

A method of manufacturing positive-electrode layer 20 of the present exemplary embodiment will be described with reference to FIGS. 9 and 10. FIGS. 9 and 10 are cross-sectional views at the respective steps and processes of manufacturing positive-electrode layer 20. FIG. 9 illustrates a case where the press time is short at a positive-electrode layer integration step to be described later. FIG. 10 illustrates a case where the press time is long at the positive-electrode layer integration step to be described later.

The positive-electrode layer forming process is a process of forming positive-electrode layer 20 that includes positive-electrode mixture layer 21 having an organic solvent concentration of 50 ppm or less and a binder concentration of 100 ppm or less. The positive-electrode layer forming process includes a positive-electrode bonding layer forming step of forming positive-electrode bonding layer 4 containing at least a conductive agent on at least one surface of positive-electrode current collector 6, a positive-electrode layer coating step of applying positive-electrode mixture powder that contains at least solid electrolyte 1 and positive-electrode active material 2 and to which a conductive assistant is added if needed on a surface having positive-electrode bonding layer 4 formed thereon, and the positive-electrode layer integration step of pressing the positive-electrode mixture powder to form positive-electrode layer 20 that is an integrated body of positive-electrode current collector 6, positive-electrode bonding layer 4, and positive-electrode mixture layer 21.

[G-2-0. Positive-Electrode Bonding Layer Forming Step]

As illustrated in a part (a) of FIG. 9, the positive-electrode bonding layer forming step is a step of forming positive-electrode bonding layer 4 on positive-electrode current collector 6. For example, positive-electrode bonding layer 4 is formed by coating a paste containing a conductive agent and a binder on positive-electrode current collector 6 and drying the paste.

[G-2-1. Positive-Electrode Layer Coating Step]

At the positive-electrode layer coating step, positive-electrode mixture powder is prepared by mixing solid electrolyte 1 and positive-electrode active material 2, adding a conductive assistant if needed, and dispersing these materials.

Positive-electrode current collector 6 on which positive-electrode bonding layer 4 prepared at the positive-electrode bonding layer forming step is formed is prepared.

As illustrated in a part (b) of FIG. 9, the resultant positive-electrode mixture powder is coated on positive-electrode bonding layer 4. The positive-electrode mixture powder does not contain a binder and has a binder concentration of 100 ppm or less.

Examples of a method of coating the positive-electrode mixture powder on positive-electrode bonding layer 4 include a method of coating positive-electrode mixture powder that does not contain an organic solvent using a vibrating feeder, a table feeder, or a screw feeder and an electrostatic coating method. The electrostatic coating method is preferable among these methods because the powder is thrown against positive-electrode bonding layer 4 using a difference in voltage and thus the positive-electrode mixture powder is temporarily fixed on positive-electrode bonding layer 4 immediately after being coated thereon.

According to the manufacturing method described above, the organic solvent is not used. The concentration of the organic solvent in positive-electrode mixture layer 21 is thus less than or equal to 50 ppm, and degradation of solid electrolyte 1 due to the organic solvent can be prevented.

A method of measuring the organic solvent is not particularly limited, and for example, gas chromatography, mass change method, and the like can be used.

[G-2-2. Positive-Electrode Layer Integration Step]

At the positive-electrode layer integration step, as illustrated in a part (c) of FIG. 9, positive-electrode mixture powder is pressed from above and below in the stacking direction together with positive-electrode current collector 6 and positive-electrode bonding layer 4. As a result, positive-electrode layer 20 that is an integrated body of positive-electrode mixture layer 21, positive-electrode bonding layer 4, and positive-electrode current collector 6 is prepared. With this pressing step, solid electrolyte 1 can be used as an adhesive material even though positive-electrode mixture layer 21 does not contain a binder functioning as the adhesive material. During a subsequent manufacturing process, positive-electrode layer 20 can be handled without the positive-electrode mixture powder being dropped from positive-electrode layer 20. If heat-pressing is performed at the positive-electrode layer integration step, denser positive-electrode mixture layer 21 can be obtained.

A mechanism of adhesion using solid electrolyte 1 includes following two points. (i) Solid electrolyte 1 and positive-electrode active material 2 in positive-electrode mixture layer 21 are adhered to each other by an anchor effect in which solid electrolyte 1 enters positive-electrode active material 2. (ii) Solid electrolytes 1 in positive-electrode mixture layer 21 closely contact with each other, and thus are adhered to each other by intermolecular force or an anchor effect due to entering of solid electrolyte 1.

Positive-electrode bonding layer 4 and positive-electrode mixture layer 21 are adhered to each other by an anchor effect in which a conductive agent contained in positive-electrode bonding layer 4 is plastically deformed to enter between positive-electrode active materials 2, between solid electrolytes 1, and between positive-electrode active material 2 and solid electrolyte 1 in positive-electrode mixture layer 21.

FIG. 9 illustrates a case where a press time is short at the positive-electrode layer integration step, as described above. As the press time is short, as illustrated in the part (c) of FIG. 9, acceleration of sintering of solid electrolyte 1 can be prevented at the positive-electrode layer integration step in the positive-electrode layer forming process. The interface between solid electrolyte layer 40 and positive-electrode mixture layer 21 has a good adhesive property in the stacking process (part (e) of FIG. 9, negative-electrode layer is not illustrated) that is performed after solid electrolyte layer 40 is formed on positive-electrode mixture layer 21 in the solid electrolyte layer forming process (part (d) of FIG. 9). In addition, a state where positive-electrode mixture layer 21 is easily deformed is maintained, and thus in pressing at a subsequent step of integrating with solid electrolyte layer 40 and a subsequent stacking process, positive-electrode mixture layer 21 and solid electrolyte layer 40 are easily deformed and opening 41 is hardly formed. As a result, good ion conductivity is maintained at the interface between solid electrolyte layer 40 and positive-electrode mixture layer 21, and thus battery characteristics of all-solid battery 100 can be improved.

A reason why good adhesion of solid electrolyte layer 40 and positive-electrode mixture layer 21 is achieved is that at the positive-electrode layer integration step illustrated in the part (c) of FIG. 9, sintering of solid electrolyte 1 is reduced and thus in the subsequent stacking process, solid electrolyte 1 contained in solid electrolyte layer 40 and solid electrolyte 1 contained in positive-electrode mixture layer 21 are sintered smoothly.

On the other hand, FIG. 10 illustrates a case where the press time is long at the positive-electrode layer integration step in the positive-electrode layer forming process.

As illustrated in a part (c) of FIG. 10, when the press time is long, sintering of solid electrolyte 1 is accelerated at the positive-electrode layer integration step. Solid electrolyte layer 40 is hardly adhered to positive-electrode mixture layer 21 in the stacking process (part (e) of FIG. 10, negative-electrode layer is not illustrated) that is performed after solid electrolyte layer 40 is formed on positive-electrode mixture layer 21 in the solid electrolyte layer forming process (part (d) of FIG. 10). As positive-electrode mixture layer 21 is hardly deformed, interface peeling 8 easily occurs between solid electrolyte layer 40 and positive-electrode mixture layer 21 and opening 41 is easily formed at the interface. Ion conduction is easily hindered by interface peeling 8 and opening 41, and thus the battery characteristics of all-solid battery 100 may not be improved.

A reason why solid electrolyte layer 40 is hardly adhered to positive-electrode mixture layer 21 is that at the positive-electrode layer integration step illustrated in the part (c) of FIG. 10, sintering of solid electrolyte 1 contained in positive-electrode mixture layer 21 is accelerated. Consequently, in the subsequent stacking process, sintering of solid electrolyte 1 contained in solid electrolyte layer 40 and solid electrolyte 1 contained in positive-electrode mixture layer 21 is hardly accelerated.

A press pressure is preferably in a range of 10 MPa to 3,000 MPa inclusive. As the press pressure is higher than or equal to 10 MPa, sufficient adhesive strength is achieved and it is possible to prevent a problem that solid electrolyte 1 and positive-electrode active material 2 are dropped from positive-electrode mixture layer 21 during a subsequent process. In addition, as the press pressure is less than or equal to 3,000 MPa, pressurizing is not so high and a problem that positive-electrode current collector 6 is broken can be prevented.

In view of increasing a filling rate of positive-electrode mixture layer 21, the press pressure is more preferably in a range of 400 MPa to 3,000 MPa inclusive.

By increasing the filling rate of positive-electrode mixture layer 21, lithium ion conductivity and electron conductivity can be improved in positive-electrode mixture layer 21, and good battery characteristics can be obtained.

In order to increase the filling rate of positive-electrode mixture layer 21, it is preferable that pressing and filling are performed at a high pressure in the positive-electrode layer forming process. If pressing is performed at a high pressure in the subsequent stacking process, negative-electrode mixture layer 31 contacts positive-electrode mixture layer 21 because solid electrolyte layer 40 is thin, and thus a problem such as a short-circuit may occur.

The filling rate means a proportion of a volume of all substances occupying an object to an apparent volume of the object. For example, the filling rate of positive-electrode mixture layer 21 means the proportion of the volume of all substances constituting positive-electrode mixture layer 21 to the apparent volume of positive-electrode mixture layer 21. A press temperature may be appropriately set depending on materials contained in positive-electrode mixture layer 21, and is, for example, in a range of 20° C. to 300° C. inclusive. To soften the solid electrolyte contained for the purpose of improving the density of positive-electrode mixture layer 21, the positive-electrode mixture layer 21 is preferably heated to 20° C. or higher. Meanwhile, in order to prevent sintering from being accelerated too much due to overheating and because layers are sintered at a step of bonding layers, the press temperature is preferably less than or equal to 300° C.

The press method in the manufacturing method described above is not particularly limited, and well-known press methods may be employed.

By using the method described above, it is possible to manufacture all-solid battery 100 that has positive-electrode mixture layer 21 that does not contain a binder hindering ion conduction. The all-solid battery with good charge-discharge characteristics can thus be obtained.

Positive-electrode mixture layer 21 does not contain a binder functioning as an adhesive material, but by pressing positive-electrode mixture layer 21, solid electrolyte 1 can be used as the adhesive material. It is thus possible to prevent positive-electrode active material 2 and solid electrolyte 1 from being dropped from positive-electrode mixture layer 21. Consequently, all-solid battery 100 with good charge-discharge characteristics can be obtained.

By reducing the press time at the positive-electrode layer integration step, good adhesion at the interface between positive-electrode mixture layer 21 and solid electrolyte layer 40 is maintained in resultant all-solid battery 100. Ion conduction is not hindered, and thus all-solid battery 100 with good charge-discharge characteristics can be obtained.

As an organic solvent is not used in a process of manufacturing positive-electrode mixture layer 21, positive-electrode mixture layer 21 does not substantially contain the organic solvent. Positive-electrode mixture layer 21 is not degraded by the organic solvent, and thus all-solid battery 100 with good charge-discharge characteristics can be manufactured.

The press time at the positive-electrode layer integration step is preferably less than or equal to 5 seconds in view of reducing sintering of solid electrolyte 1 as described above. As the press time is less than or equal to 5 seconds, interface peeling 8 between solid electrolyte layer 40 and positive-electrode mixture layer 21 is prevented and opening 41 is also prevented from being formed at the interface. Consequently, the battery characteristics of all-solid battery 100 are improved and the shape of all-solid battery 100 is maintained.

[G-3. Method of Manufacturing Negative-Electrode Layer]

Figure 11:
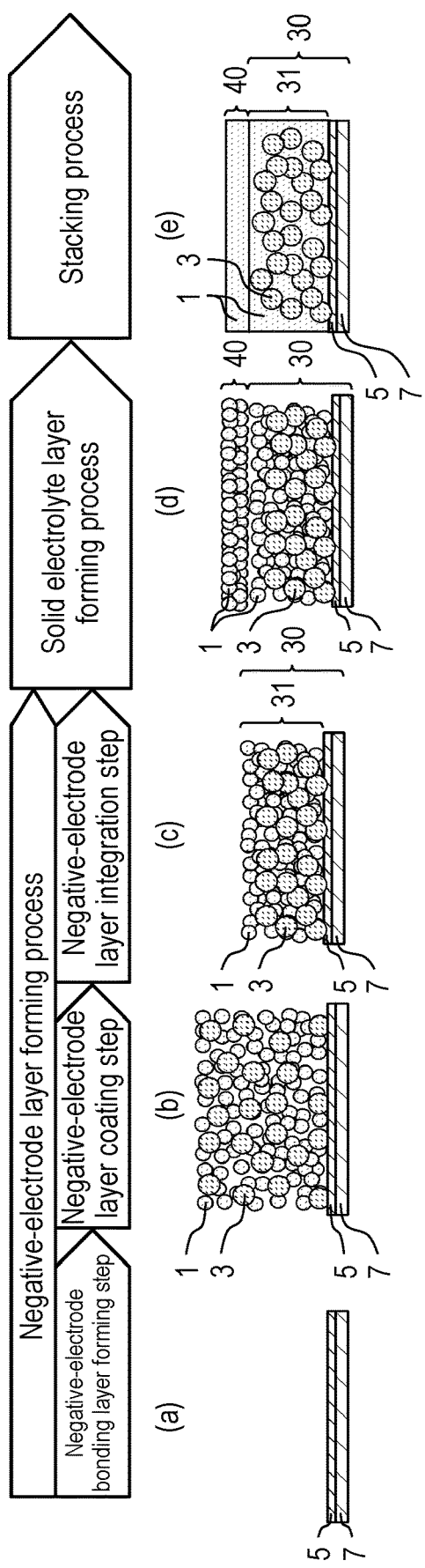
FIG. 11 is a schematic cross-sectional view illustrating a method of manufacturing a negative-electrode layer of the present exemplary embodiment.
Figure 12:
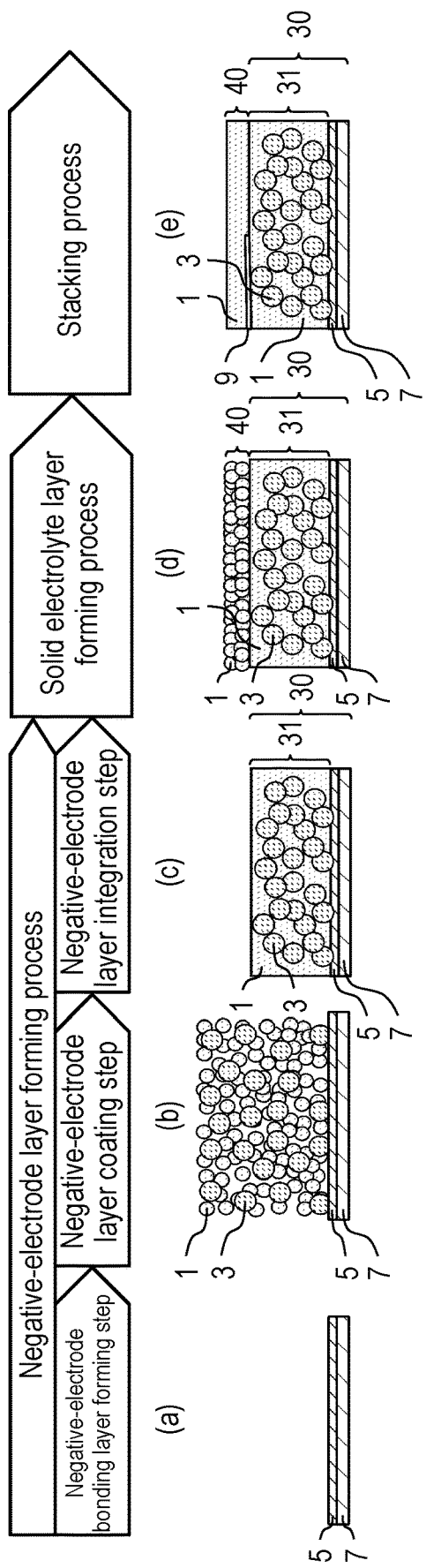
FIG. 12 is a schematic cross-sectional view illustrating a case where the press time is long in the method of manufacturing a negative-electrode layer of the present exemplary embodiment.

Next, a method of manufacturing negative-electrode layer 30 of the present exemplary embodiment will be described with reference to FIGS. 11 and 12. FIGS. 11 and 12 are cross-sectional views at the respective steps and processes of manufacturing negative-electrode layer 30. FIG. 11 illustrates a case where a press time is short at a negative-electrode layer integration step to be described later. FIG. 12 illustrates a case where the press time is long at the negative-electrode layer integration step to be described later.

Negative-electrode layer 30 is prepared by a method basically similar to the method of preparing positive-electrode layer 20 described above except that materials to be used are changed to materials for negative-electrode layer 30 and a preferable press pressure is changed.

The negative-electrode layer forming process is a process of forming negative-electrode layer 30 that includes negative-electrode mixture layer 31 having an organic solvent concentration of 50 ppm or less and a binder concentration of 100 ppm or less. The negative-electrode layer forming process includes a negative-electrode bonding layer forming step of forming negative-electrode bonding layer 5 containing at least a conductive agent on at least one surface of negative-electrode current collector 7, a negative-electrode layer coating step of applying negative-electrode mixture powder that contains at least solid electrolyte 1 and negative-electrode active material 3 and to which a conductive assistant is added if needed on negative-electrode bonding layer 5 formed, and the negative-electrode layer integration step of pressing the negative-electrode mixture powder to form negative-electrode layer 30 that is an integrated body of negative-electrode current collector 7, negative-electrode bonding layer 5, and negative-electrode mixture layer 31.

[G-3-0. Negative-Electrode Bonding Layer Forming Step]

As illustrated in a part (a) of FIG. 11, the negative-electrode bonding layer forming step is a step of forming negative-electrode bonding layer 5 on negative-electrode current collector 7. For example, negative-electrode bonding layer 5 is formed by coating a paste containing a conductive agent and a binder on negative-electrode current collector 7 and drying the paste.

[G-3-1. Negative-Electrode Layer Coating Step]

At the negative-electrode layer coating step, negative-electrode mixture powder is prepared by mixing solid electrolyte 1 and negative-electrode active material 3, adding a conductive assistant if needed, and dispersing these materials.

Negative-electrode current collector 7 on which negative-electrode bonding layer 5 prepared at the negative-electrode bonding layer forming step is formed is prepared.

As illustrated in a part (b) of FIG. 11, the resultant negative-electrode mixture powder is coated on negative-electrode bonding layer 5. The negative-electrode mixture powder does not contain a binder and has a binder concentration of 100 ppm or less.

Examples of a method of coating the negative-electrode mixture powder on negative-electrode bonding layer 5 include a method of coating negative-electrode mixture powder that does not contain an organic solvent using a vibrating feeder, a table feeder, or a screw feeder and an electrostatic coating method. The electrostatic coating method is preferable among these methods because the powder is thrown against negative-electrode bonding layer 5 using a difference in voltage and thus the negative-electrode mixture powder is temporarily fixed on negative-electrode bonding layer 5 immediately after being coated thereon.

According to the manufacturing method described above, the organic solvent is not used. The concentration of the organic solvent in negative-electrode mixture layer 31 is thus less than or equal to 50 ppm, and degradation of solid electrolyte 1 due to the organic solvent can be prevented.

[G-3-2. Negative-Electrode Layer Integration Step]

At the negative-electrode layer integration step, as illustrated in a part (c) of FIG. 11, negative-electrode mixture powder is pressed from above and below in the stacking direction together with negative-electrode current collector 7 and negative-electrode bonding layer 5. As a result, negative-electrode layer 30 that is an integrated body of negative-electrode mixture layer 31, negative-electrode bonding layer 5, and negative-electrode current collector 7 is prepared. With this pressing step, solid electrolyte 1 can be used as an adhesive material even though negative-electrode mixture layer 31 does not contain a binder functioning as the adhesive material. During a subsequent process, negative-electrode layer 30 can be handled without the negative-electrode mixture powder being dropped from negative-electrode layer 30. Heat-pressing is performed at the negative-electrode layer integration step.

A mechanism of adhesion using solid electrolyte 1 includes following three points. (i) Solid electrolyte 1 and negative-electrode active material 3 in negative-electrode mixture layer 31 are adhered to each other by an anchor effect in which solid electrolyte 1 enters negative-electrode active material 3 and vice versa. (ii) As solid electrolyte 1 and negative-electrode active material 3 closely contact with each other, adhesive strength due to intermolecular force is obtained. (iii) Solid electrolytes 1 in negative-electrode mixture layer 31 closely contact with each other, and thus are adhered to each other by intermolecular force or an anchor effect due to entering of solid electrolyte 1.

Negative-electrode bonding layer 5 and negative-electrode mixture layer 31 also obtain adhesive strength from intermolecular force due to close contact of negative-electrode bonding layer 5, and negative-electrode active material 3 and solid electrolyte 1 that are contained in negative-electrode mixture layer 31. In particular, when negative-electrode active material 3 contained in negative-electrode mixture layer 31 is a conductive carbon material, it is preferable because negative-electrode mixture layer 31 obtains high adhesive strength with negative-electrode bonding layer 5. A reason why negative-electrode active material 3 is preferably the conductive carbon material is that negative-electrode bonding layer 5 contains the conductive carbon material as a main component thus has the same material system as negative-electrode active material 3 contained in negative-electrode mixture layer 31, and high material affinity is achieved.

FIG. 11 illustrates a case where a press time is short at the negative-electrode layer integration step, as described above. As the press time is short, as illustrated in the part (c) of FIG. 11, acceleration of sintering of solid electrolyte 1 can be prevented at the negative-electrode layer integration step in the negative-electrode layer forming process. The interface between solid electrolyte layer 40 and negative-electrode mixture layer 31 has a good adhesive property in the stacking process (part (e) of FIG. 11, positive-electrode layer is not illustrated) that is performed after solid electrolyte layer 40 is formed on negative-electrode mixture layer 31 in the solid electrolyte layer forming process (part (d) of FIG. 11). As a result, good ion conductivity is maintained at the interface between solid electrolyte layer 40 and negative-electrode mixture layer 31, and thus battery characteristics of all-solid battery 100 can be improved.

A reason why good adhesive property of solid electrolyte layer 40 and negative-electrode mixture layer 31 is achieved is that at the negative-electrode layer integration step illustrated in the part (c) of FIG. 11, sintering of solid electrolyte 1 is reduced and thus in the subsequent stacking process, solid electrolyte 1 contained in solid electrolyte layer 40 and solid electrolyte 1 contained in negative-electrode mixture layer 31 are sintered smoothly.

On the other hand, FIG. 12 illustrates a case where the press time is long at the negative-electrode layer integration step in the negative-electrode layer forming process.

As illustrated in a part (c) of FIG. 12, when the press time is long, sintering of solid electrolyte 1 is accelerated at the negative-electrode layer integration step. Solid electrolyte layer 40 is hardly adhered to negative-electrode mixture layer 31 and interface peeling 9 occurs between solid electrolyte layer 40 and negative-electrode mixture layer 31 in the stacking process (part (e) of FIG. 12, positive-electrode layer is not illustrated) that is performed after solid electrolyte layer 40 is formed on negative-electrode mixture layer 31 in the solid electrolyte layer forming process (part (d) of FIG. 12). Ion conduction is easily hindered by the interface peeling, and thus the battery characteristics of all-solid battery 100 may not be improved.

A reason why solid electrolyte layer 40 is hardly adhered to negative-electrode mixture layer 31 is that at the negative-electrode layer integration step illustrated in the part (c) of FIG. 12, sintering of solid electrolyte 1 is accelerated and thus in the subsequent stacking process, sintering of solid electrolyte 1 contained in solid electrolyte layer 40 and solid electrolyte 1 contained in negative-electrode mixture layer 31 is hardly accelerated.

A press pressure is preferably in a range of 10 MPa to 3,000 MPa inclusive. As the press pressure is higher than or equal to 10 MPa, sufficient adhesive strength is achieved and it is possible to prevent a problem that solid electrolyte 1 and negative-electrode active material 3 are dropped from negative-electrode mixture layer 31 during a subsequent process. As the press pressure is less than or equal to 3,000 MPa, pressurizing is not so high and a problem that negative-electrode current collector 7 is broken can be prevented.

In view of increasing a filling rate of negative-electrode mixture layer 31, the press pressure is more preferably in a range of 50 MPa to 1,000 MPa inclusive. As negative-electrode mixture layer 31 is more deformed than positive-electrode mixture layer 21, the filling rate can be increased at a press pressure lower than the press pressure at the positive-electrode layer integration step described above.

By increasing the filling rate of negative-electrode mixture layer 31, lithium ion conductivity and electron conductivity can be improved in negative-electrode mixture layer 31, and good battery characteristics can be obtained.

In order to increase the filling rate of negative-electrode mixture layer 31, it is preferable that pressing and filling are performed at a high pressure in the negative-electrode layer forming process. If pressing is performed at a high pressure in the subsequent stacking process, negative-electrode mixture layer 31 contacts positive-electrode mixture layer 21 because solid electrolyte layer 40 is thin, and thus a problem such as a short-circuit may occur.

The filling rate means a proportion of a volume of all substances occupying an object to an apparent volume of the object. For example, the filling rate of negative-electrode mixture layer 31 means the proportion of the volume of all substances constituting negative-electrode mixture layer 31 to the apparent volume of negative-electrode mixture layer 31. A press temperature may be appropriately set depending on materials contained in negative-electrode mixture layer 31, and is, for example, in a range of 20° C. to 300° C. inclusive. To soften the solid electrolyte contained for the purpose of improving the density of negative-electrode mixture layer 31, negative-electrode mixture layer 31 is preferably heated to 20° C. or higher. Meanwhile, in order to prevent sintering from being accelerated too much due to overheating and because layers are sintered at a step of bonding layers, the press temperature is preferably less than or equal to 300° C.

The press method in the manufacturing method described above is not particularly limited, and well-known press methods may be employed.

By using the method described above, it is possible to manufacture all-solid battery 100 that has negative-electrode mixture layer 31 that does not contain a binder hindering ion conduction. The all-solid battery with good charge-discharge characteristics can thus be obtained.

Negative-electrode mixture layer 31 does not contain a binder functioning as an adhesive material, but by pressing negative-electrode mixture layer 31, solid electrolyte 1 can be used as the adhesive material. It is thus possible to prevent negative-electrode active material 3 and solid electrolyte 1 from being dropped from negative-electrode mixture layer 31. Consequently, all-solid battery 100 with good charge-discharge characteristics can be obtained.

By reducing the press time at the negative-electrode layer integration step, good adhesion at the interface between negative-electrode mixture layer 31 and solid electrolyte layer 40 is maintained in resultant all-solid battery 100. Ion conduction is not hindered, and thus all-solid battery 100 with good charge-discharge characteristics can be obtained.

As an organic solvent is not used in a process of manufacturing negative-electrode mixture layer 31, negative-electrode mixture layer 31 does not substantially contain the organic solvent. Negative-electrode mixture layer 31 is not degraded by the organic solvent, and thus all-solid battery 100 with good charge-discharge characteristics can be manufactured.

The press time at the negative-electrode layer integration step is preferably less than or equal to 5 seconds in view of reducing sintering of solid electrolyte 1 as described above. As the press time is less than or equal to 5 seconds, interface peeling 9 between solid electrolyte layer 40 and negative-electrode mixture layer 31 is prevented. Consequently, the battery characteristics of all-solid battery 100 are improved and the shape of all-solid battery 100 is maintained.

[G-4. Method of Manufacturing Solid Electrolyte Layer]

Figure 13:
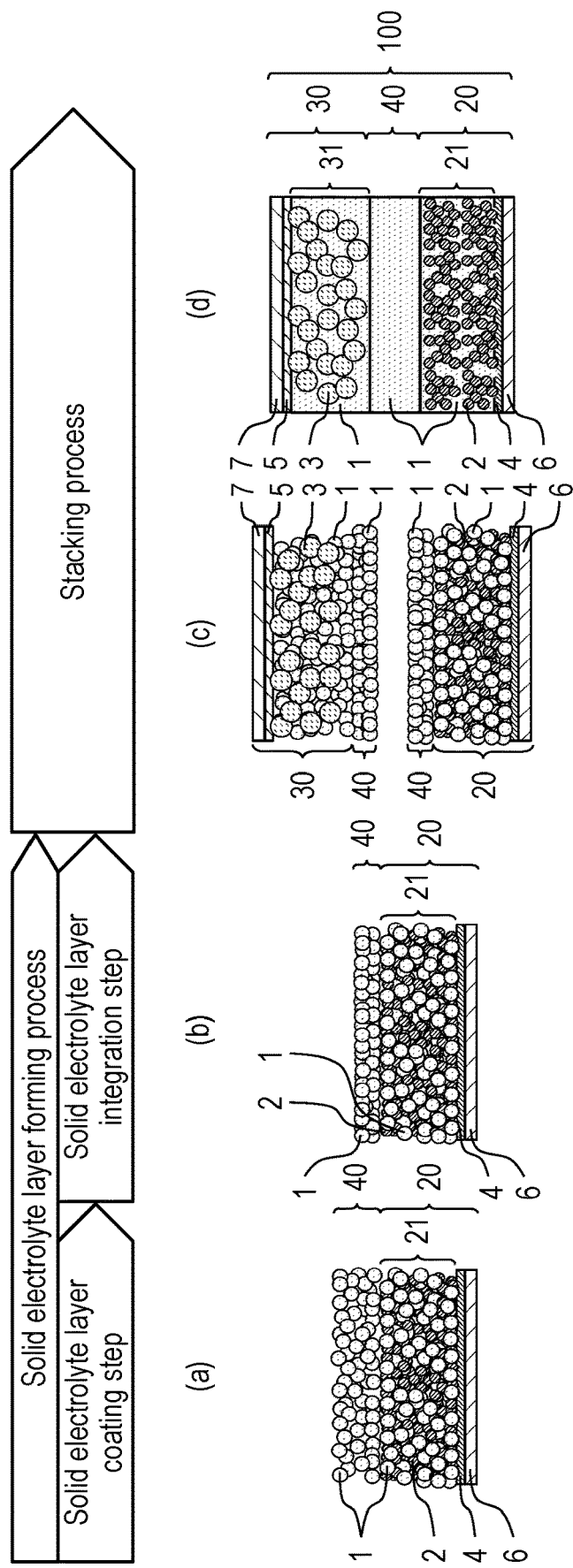
FIG. 13 is a schematic cross-sectional view illustrating a method of manufacturing a solid electrolyte layer of the present exemplary embodiment.
Figure 14:
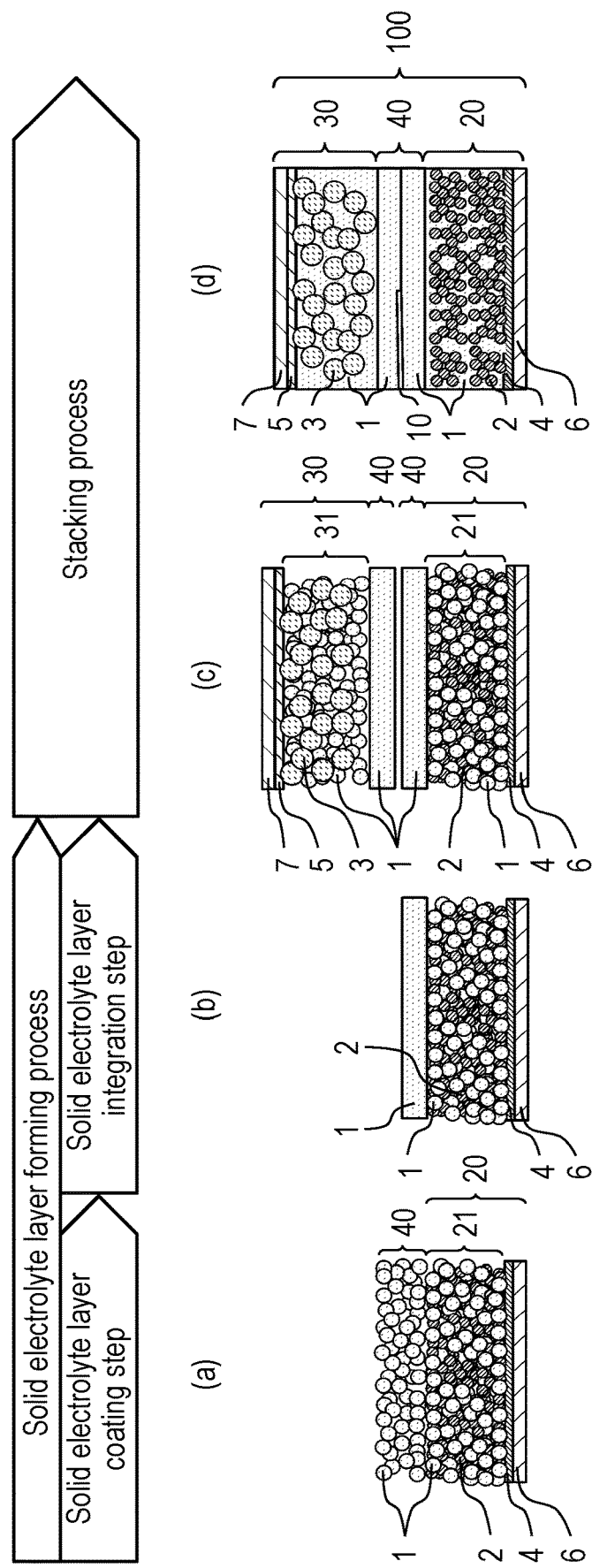
FIG. 14 is a schematic cross-sectional view illustrating a case where the press time is long in the method of manufacturing a solid electrolyte layer of the present exemplary embodiment.

A method of manufacturing solid electrolyte layer 40 of the present exemplary embodiment will be described with reference to FIGS. 13 and 14. FIGS. 13 and 14 are cross-sectional views at the respective steps and processes of manufacturing solid electrolyte layer 40. FIG. 13 illustrates a case where a press time is short at a solid electrolyte layer integration step to be described later. FIG. 14 illustrates a case where the press time is long at the solid electrolyte layer integration step to be described later.

Solid electrolyte layer 40 is prepared by a method basically similar to the methods of preparing positive-electrode layer 20 and negative-electrode layer 30 described above except that powder of solid electrolyte 1 is coated on at least one of positive-electrode layer 20 and negative-electrode layer 30, and a preferable press pressure is changed.

A solid electrolyte layer forming process is a process of forming solid electrolyte layer 40 on at least one of positive-electrode mixture layer 21 of positive-electrode layer 20 and negative-electrode mixture layer 31 of negative-electrode layer 30. The solid electrolyte layer forming process includes a solid electrolyte layer coating step of applying solid electrolyte powder on at least one surface of positive-electrode mixture layer 21 of positive-electrode layer 20 and at least one surface of negative-electrode mixture layer 31 of negative-electrode layer 30, and a solid electrolyte layer integration step of pressing positive-electrode layer 20 and negative-electrode layer 30 having the solid electrolyte powder applied thereon at the solid electrolyte layer coating step from above and below in a stacking direction to form solid electrolyte layer 40 that is integrated with at least one of positive-electrode layer 20 and negative-electrode layer 30 having the solid electrolyte powder applied thereon.

As the method of coating solid electrolyte 1 on positive-electrode layer 20 is the same as the method of coating solid electrolyte 1 on negative-electrode layer 30 except that the material to be coated is changed from positive-electrode layer 20 to negative-electrode layer 30, a case of coating the solid electrolyte 1 on positive-electrode layer 20 will be described.

[G-4-1. Solid Electrolyte Layer Coating Step]

At the solid electrolyte layer coating step, solid electrolyte powder containing solid electrolyte 1 is prepared first. As illustrated in a part (b) of FIG. 13, the solid electrolyte powder is coated on positive-electrode mixture layer 21 of positive-electrode layer 20.

The method of coating the solid electrolyte powder on positive-electrode mixture layer 21 of positive-electrode layer 20 is preferably a method in which a material to be coated with the solid electrolyte powder does not contain an organic solvent, and more preferably a method in which the material to be coated with the solid electrolyte powder does not contain a binder. The method in which the material to be coated with the solid electrolyte powder does not contain the organic solvent is preferable, because degradation by the organic solvent contained in solid electrolyte 1 can be prevented. The method in which the material to be coated with the solid electrolyte powder does not contain the binder is preferable, because a decrease in ion conductivity due to the binder can be prevented.

Examples of the method in which the material to be coated with the solid electrolyte powder does not contain the organic solvent and the binder include a method of coating the solid electrolyte powder using a vibrating feeder, a table feeder, or a screw feeder and an electrostatic coating method. The electrostatic coating method is preferable among these methods because the powder is thrown against positive-electrode layer 20 using a difference in voltage and thus the solid electrolyte powder is temporarily fixed on positive-electrode layer 20 immediately after being coated thereon even though positive-electrode layer 20 does not contain the binder.

According to the manufacturing method described above, the organic solvent is not used. The concentration of the organic solvent in solid electrolyte layer 40 is thus less than or equal to 50 ppm, and degradation of solid electrolyte 1 due to the organic solvent can be prevented.

The solid electrolyte powder does not contain a binder and has a binder concentration of 100 ppm or less.

[G-4-2. Solid Electrolyte Layer Integration Step]

At the solid electrolyte layer integration step, as illustrated in a part (b) of FIG. 13, by pressing positive-electrode layer 20 having solid electrolyte powder applied thereon from above and below in a stacking direction, an integrated body of solid electrolyte layer 40 and positive-electrode layer 20 is prepared. With this pressing step, solid electrolyte 1 can be used as an adhesive material even though solid electrolyte layer 40 does not contain a binder functioning as the adhesive material. During a subsequent manufacturing process, solid electrolyte layer 40 can be handled without the solid electrolyte powder being dropped from solid electrolyte layer 40. Heat-pressing is performed at the solid electrolyte layer integration step.

A mechanism of adhesion using solid electrolyte 1 is as follows. That is, solid electrolytes 1 in solid electrolyte layer 40 closely contact with each other, and thus are adhered to each other by intermolecular force or an anchor effect due to entering of solid electrolyte 1.

Solid electrolyte layer 40 and positive-electrode layer 20 are adhered to each other by an anchor effect in which solid electrolyte 1 in solid electrolyte layer 40 enters positive-electrode active material 2 in positive-electrode mixture layer 21. Further, solid electrolytes 1 in solid electrolyte layer 40 and positive-electrode mixture layer 21 closely contact with each other, and thus are adhered to each other by the intermolecular force or the anchor effect due to entering of solid electrolyte 1.

FIG. 13 illustrates a case where a press time is short at the solid electrolyte layer integration step, as described above. As the press time is short, as illustrated in the part (b) of FIG. 13, acceleration of sintering of solid electrolyte 1 can be prevented at the solid electrolyte layer integration step in the solid electrolyte layer forming process. The interface between solid electrolyte layers 40 has a good adhesive property in the subsequent stacking process (the parts (c) and (d) of FIG. 13). As a result, good ion conductivity is maintained at the interface between solid electrolyte layers 40, and thus battery characteristics of all-solid battery 100 can be improved.

A reason why good adhesive property of solid electrolyte layers 40 is achieved is that at the solid electrolyte layer integration step illustrated in the part (b) of FIG. 13, sintering of solid electrolyte 1 is reduced and thus in the subsequent stacking process, solid electrolyte 1 contained in solid electrolyte layer 40 on positive-electrode layer 20 and solid electrolyte 1 contained in solid electrolyte layer 40 on negative-electrode layer 30 are sintered smoothly.

On the other hand, FIG. 14 illustrates a case where the press time is long at the solid electrolyte layer integration step in the solid electrolyte layer forming process.

As illustrated in a part (b) of FIG. 14, when the press time is long, sintering of solid electrolyte 1 is accelerated at the solid electrolyte layer integration step. In the stacking process (parts (c) and (d) of FIG. 14), solid electrolyte layers 40 are hardly adhered to each other and interface peeling 10 occurs between solid electrolyte layers 40. Ion conduction is easily hindered by the interface peeling, and thus the battery characteristics of all-solid battery 100 may not be improved.

A reason why solid electrolyte layers 40 are hardly adhered to each other is that at the solid electrolyte layer integration step illustrated in the part (b) of FIG. 14, sintering of solid electrolyte 1 is accelerated and thus in the subsequent stacking process, sintering of solid electrolyte 1 contained in solid electrolyte layer 40 of positive-electrode layer 20 and solid electrolyte 1 contained in solid electrolyte layer 40 of negative-electrode layer 30 is hardly accelerated.

A press pressure is preferably in a range of 1 MPa to 1,000 MPa inclusive. As the press pressure is higher than or equal to 1 MPa, sufficient adhesive strength is achieved and it is possible to prevent a problem that solid electrolyte 1 is dropped from solid electrolyte layer 40 during a subsequent process. A reason why the press pressure is lower than or equal to 1,000 MPa is that solid electrolyte layer 40 is easily deformed and thus the adhesive strength is not increased even if a pressure higher than 1,000 MPa is applied to solid electrolyte layer 40. A press temperature may be appropriately set depending on materials contained in solid electrolyte layer 40, and is, for example, in a range of 20° C. to 400° C. inclusive. The press temperature is more preferably higher than the temperatures at the positive-electrode layer integration step and the negative-electrode layer integration step. This is because sintering of layers is accelerated and thus a bonding state is improved. Meanwhile, in view of decreased ion conductivity, a heating temperature is preferably lower than or equal to 400° C.

In the stacking process, stacking is preferably performed by disposing negative-electrode layer 30 above positive-electrode layer 20. For example, an electrostatic coating method is used as the method of forming solid electrolyte layer 40 that does not contain a binder on positive-electrode mixture layer 21 of positive-electrode layer 20 and negative-electrode mixture layer 31 of negative-electrode layer 30. When the electrostatic coating method is used, solid electrolyte layer 40 tends to closely contact the negative-electrode layer as compared to positive-electrode layer 20. As negative-electrode layer 30 having a good close contact property with solid electrolyte layer 40 is disposed above positive-electrode layer 20, solid electrolyte layer 40 that is disposed under negative-electrode layer 30 is hardly removed from negative-electrode layer 30 when these layers are inverted upside down. It is thus preferable to dispose negative-electrode layer 30 above positive-electrode layer 20.

A method of forming solid electrolyte layer 40 on positive-electrode layer 20 and negative-electrode layer 30 is described in the solid electrolyte layer forming process described above. However, solid electrolyte layer 40 may be formed on one of positive-electrode layer 20 and negative-electrode layer 30.

The press method in the manufacturing method described above is not particularly limited, and well-known press methods may be employed.

By using the method described above, it is possible to manufacture all-solid battery 100 that has solid electrolyte layer 40 that does not contain a binder hindering ion conduction. The all-solid battery with good charge-discharge characteristics can thus be obtained. This means that the content of the binder is less than or equal to 100 ppm.

Solid electrolyte layer 40 does not contain a binder functioning as an adhesive material, but by pressing solid electrolyte layer 40, solid electrolyte 1 can be used as the adhesive material. It is thus possible to prevent solid electrolyte 1 from being dropped from solid electrolyte layer 40. Consequently, all-solid battery 100 with good charge-discharge characteristics can be obtained.

By reducing the press time at the solid electrolyte layer integration step, good adhesion at the interface between solid electrolyte layers 40 is maintained in resultant all-solid battery 100. Consequently, ion conduction is not hindered, and all-solid battery 100 with good charge-discharge characteristics can be obtained.

While the method in which solid electrolyte layer 40 does not contain a binder is described as a preferable example, solid electrolyte layer 40 may contain the binder if needed. Solid electrolyte layer 40 may contain the binder because solid electrolyte layer 40 is thin and if a small amount of the binder is contained in solid electrolyte layer 40, ion conduction is hardly hindered and the battery characteristics of all-solid battery 100 are not affected.

It is only required that the content of the binder in solid electrolyte layer 40 is less than or equal to 1 wt % of solid electrolyte 1, when the binder functions to reinforce adhesive strength.

An organic solvent is not used in a process of manufacturing solid electrolyte layer 40. The concentration of the organic solvent in solid electrolyte layer 40 is thus less than or equal to 50 ppm. As a result, solid electrolyte layer 40 is not degraded by the organic solvent, and all-solid battery 100 with good charge-discharge characteristics can be manufactured.

The press time at the solid electrolyte layer integration step is preferably less than or equal to 5 seconds in view of reducing sintering of solid electrolyte 1 as described above. As the press time is less than or equal to 5 seconds, interface peeling 9 between solid electrolyte layers 40 is prevented. Consequently, the battery characteristics of all-solid battery 100 are improved and the shape of all-solid battery 100 is maintained.

Other Exemplary Embodiments

The present disclosure is not limited to the exemplary embodiment. The exemplary embodiment is merely an example. Note that anything that has substantially the same configuration and exhibits the similar operations and effects as the technical idea described in the claims of the present disclosure is within the technical scope of the present disclosure. Without departing from the spirit of the present disclosure, various modifications made to the exemplary embodiments by those skilled in the art or others forms constructed by combining some components in the exemplary embodiments are also within the scope of the present disclosure.

In the exemplary embodiment described above, the all-solid battery includes the positive-electrode layer having the positive-electrode bonding layer and the negative-electrode layer having the negative-electrode bonding layer. However, one of the positive-electrode bonding layer and the negative-electrode bonding layer may be provided, and the positive-electrode layer that does not have the positive-electrode bonding layer or the negative-electrode layer that does not have the negative-electrode bonding layer may contain a minimum amount of a binder necessary for maintaining the shape of the all-solid battery. For example, the all-solid battery may include a positive-electrode layer that includes (i) a positive-electrode current collector, (ii) a positive-electrode bonding layer that is formed on the positive-electrode current collector, and (iii) a positive-electrode mixture layer that is formed on the positive-electrode bonding layer, a negative-electrode layer that includes (i) a negative-electrode current collector and (ii) a negative-electrode mixture layer, and a solid electrolyte layer that is disposed between the positive-electrode mixture layer and the negative-electrode mixture layer. A concentration of a binder contained in the positive-electrode mixture layer may be less than or equal to 100 ppm and a concentration of a solvent contained in the positive-electrode mixture layer may be less than or equal to 50 ppm. Alternatively, for example, the all-solid battery may include a positive-electrode layer that includes (i) a positive-electrode current collector and (ii) a positive-electrode mixture layer, a negative-electrode layer that includes (i) a negative-electrode current collector, (ii) a negative-electrode bonding layer that is formed on the negative-electrode current collector, and (iii) a negative-electrode mixture layer that is formed on the negative-electrode bonding layer, and a solid electrolyte layer that is disposed between the positive-electrode mixture layer and the negative-electrode mixture layer and contains a solid electrolyte having ion conductivity. A concentration of a binder contained in the negative-electrode mixture layer may be less than or equal to 100 ppm and a concentration of a solvent contained in the negative-electrode mixture layer is less than or equal to 50 ppm.

According to the present disclosure, it is possible is to provide an all-solid battery whose shape is maintained even though a positive-electrode mixture layer does not contain a binder.

The positive-electrode layer, the negative-electrode layer, the solid electrolyte layer, and the all-solid battery including the respective layers according to the present disclosure are expected to be applicable to power supplies for portable electronic apparatuses or various batteries including an on-vehicle battery.

What is claimed is:

1. An all-solid battery comprising:
   a positive-electrode layer that includes (i) a positive-electrode current collector, (ii) a positive-electrode bonding layer that contains at least a first conductive agent comprising non-metal and is formed on the positive-electrode current collector, and (iii) a positive-electrode mixture layer that contains at least a positive-electrode active material and a solid electrolyte having ion conductivity and is formed on the positive-electrode bonding layer;
   a negative-electrode layer that includes (i) a negative-electrode current collector and (ii) a negative-electrode mixture layer that contains at least a negative-electrode active material and a solid electrolyte having ion conductivity; and
   a solid electrolyte layer that is disposed between the positive-electrode mixture layer and the negative-electrode mixture layer and contains at least a solid electrolyte having ion conductivity,
   wherein a concentration of a binder contained in the positive-electrode mixture layer is less than or equal to 100 ppm and a concentration of a solvent contained in the positive-electrode mixture layer is less than or equal to 50 ppm, and
   wherein as viewed from a direction perpendicular to a stacking direction of the all-solid battery, a part of at least one of the positive-electrode active material and the solid electrolyte that are contained in the positive-electrode mixture layer overlaps the positive-electrode bonding layer, and a thickness of a region in the stacking direction is in a range of 2 μm to 6 μm, inclusive, the region being a region where the positive-electrode mixture layer overlaps the positive-electrode bonding layer.

2. The all-solid battery according to claim 1, wherein a weight per unit area of the positive-electrode bonding layer is in a range of 0.3 g/m2 to 3 g/m2, inclusive.

3. The all-solid battery according to claim 1, wherein in a cross-section of the all-solid battery taken along the stacking direction, a number of openings that are present at an interface between the positive-electrode mixture layer and the solid electrolyte layer is less than or equal to 3 per a length of the interface of 1 mm, each of the openings having a flat side, along the interface, of 2 μm or longer and a height, from the flat side, of 0.5 μm or higher.

4. The all-solid battery according to claim 1, wherein a concentration of a binder contained in the solid electrolyte layer is less than or equal to 100 ppm and a concentration of a solvent contained in the solid electrolyte layer is less than or equal to 50 ppm.

* * * * *